United States Patent [19]

Hsu et al.

[11] Patent Number: 5,019,766
[45] Date of Patent: May 28, 1991

[54] METHOD AND APPARATUS FOR IMPROVING PERFORMANCE OF AC MACHINES

[75] Inventors: John S. Hsu; Herbert H. Woodson, both of Austin, Tex.

[73] Assignee: University of Texas, Austin, Tex.

[21] Appl. No.: 376,622

[22] Filed: Jul. 7, 1989

Related U.S. Application Data

[63] Continuation-in-part of Ser. No. 888,818, Jul. 22, 1986, abandoned.

[51] Int. Cl.[5] ............................................. H02M 5/45
[52] U.S. Cl. .................................... 318/807; 318/812; 310/184
[58] Field of Search ............... 318/812, 254, 730, 732, 318/773, 807; 310/43, 184

[56] References Cited

U.S. PATENT DOCUMENTS

| | | | |
|---|---|---|---|
| 3,970,914 | 7/1976 | Salzmann et al. | 318/812 |
| 4,039,909 | 8/1977 | Baker | 318/732 |
| 4,225,914 | 9/1980 | Hirata et al. | 363/43 |
| 4,260,923 | 4/1981 | Rawcliffe | 318/773 |
| 4,445,080 | 4/1984 | Curtiss | 318/807 |
| 4,503,377 | 3/1985 | Kitabayashi et al. | 318/730 |
| 4,566,179 | 1/1986 | Sawyer et al. | 310/184 |
| 4,573,003 | 2/1986 | Lipo | 318/254 |

Primary Examiner—William M. Shoop, Jr.
Assistant Examiner—John W. Cabeca
Attorney, Agent, or Firm—Arnold, White & Durkee

[57] ABSTRACT

A method and apparatus for improving the performance of polyphase AC machine is provided. The machines are excited with both a fundamental frequency and with an odd harmonic of the fundamental frequency so that a fundamental flux wave and an odd harmonic flux wave travel at a synchronized speed within the air-gap of the machine. The phase angle between the fundamental and odd harmonic excitation is controlled to increase the magnetic loading of one portion of the machine, while reducing the magnetic loading of the another portion of the machine. In this manner, redistribution of the flux densities is effected to more efficiently use the various components of the machine to increase torque.

15 Claims, 19 Drawing Sheets

METHOD AND APPARATUS FOR IMPROVING PERFORMANCE OF AC MACHINES

BACKGROUND OF THE INVENTION

1. Field of the Invention

The present invention relates generally to methods and apparatus for improving the performance of alternating current (AC) machines and, more specifically, to methods and apparatus for improving the performance of polyphase AC machines through the injection of harmonic frequencies into the excitation current.

2. Description of the Related Art

With conventional polyphase AC machines, both induction and synchronous, the machines are typically operated by a single frequency source. The machines have armature windings to which the single frequency sine waves are applied. The ideal performance of conventional polyphase AC machines includes a sinusoidal air-gap flux wave of constant amplitude rotating around the air-gap at synchronous speed. In this theoretical, ideal polyphase AC machine, the constant amplitude flux wave produces a constant electromagnetic torque. The torque of the machine is monotonically dependent upon this constant amplitude flux wave. This ideal situation is approximated in large scale machines.

In conventional AC machines the magnetic flux per pole of the machine is proportional to the area of $\frac{1}{2}$ sine wave of the air-gap flux wave of the machine. Typically, a conventional AC machine is designed to operate with at least one of the magnetic members, the iron core or teeth, of the machine in flux saturation. In conventional machines, the saturation flux densities of the iron, or other magnetic members, of the stator and rotor determine the maximum amplitude of the air-gap flux wave. In conventional machines, therefore, the amplitude of the fundamental flux sine wave determines the maximum power output of the machine. This is true even though maximum use is not made of all of the flux capability of the magnetic members.

In conventional AC machines, undesirable space harmonics are typically established in the air-gap flux waves. These naturally-arising space harmonics occur as a function of the particular machine design when excited by a fundamental frequency. Factors such as slots in the machines and core saturation contribute to the generation of these undesirable space harmonics. These space harmonic flux waves are undesirable because they typically rotate in the air-gap at speeds other than that at which the fundamental flux wave rotates. Additionally, the space harmonic flux waves travel in both forward and backward directions, as well as at different speeds, relative to the fundamental flux wave.

For example, a naturally-arising fifth space harmonic flux wave travels in a reverse direction relative to the fundamental flux wave and at 1/5 the speed of the fundamental flux wave. Similarly, a naturally-arising seventh space harmonic flux wave travels in the same direction as the fundamental flux wave, but at 1/7 the speed. These space harmonic flux waves interact with the squirrel cage winding in an induction motor, or with the damper winding in a synchronous motor, to produce a braking torque that reduces the useful output of the machine. Additionally, these naturally-generated space harmonic flux waves interact with each other, and with the fundamental flux wave, to cause pulsations in the torque of the machine, as well as unwanted mechanical vibrations.

Accordingly, the present invention provides a new method and apparatus for constructing and operating a polyphase AC machine whereby a harmonic flux wave travels in the same direction, and at the same (synchronous) speed, as the fundamental flux wave and whereby the fundamental flux wave is augmented in response to the harmonic flux wave so as to achieve improved electromagnetic loading in the magnetic path of the machine; both achievements serving to improve the useful output of a given machine.

SUMMARY OF THE INVENTION

The methods and apparatus of the present invention improve the performance of polyphase AC machines through excitation of the machine with frequencies which are odd harmonics of the fundamental excitation frequency. This odd harmonic excitation serves to improve performance of the machine in several ways: (a) the flux distribution caused by the harmonic excitation enables a greater fundamental flux distribution and thereby yields an improved total flux distribution in the magnetic path of the machine; (b) alternatively, the phase relationship between the harmonic and fundamental excitation is controlled to increase the fundamental flux distribution within selected components of the motor, thereby improving utilization of the flux capability of each of the magnetic members within the motor by more uniformly loading each of the magnetic members, and (c) if the other conductors on the machine (typically on the rotor) contain conductors or coils responsive to the harmonic frequencies applied to the armature, of if the pole shape of the rotor produces a permeance wave responsive to the harmonic frequencies, the harmonic flux distributions themselves yield increased torque in the machine.

As is discussed in more detail later herein, this odd harmonic excitation can be practiced in a variety of ways, including: separate coils for fundamental excitation and for each odd harmonic excitation; multiphase power supplies for both fundamental and harmonic frequencies coupled to a common winding; the use of a multiplicity of delta-connected windings coupled to one another through volt-amp balancers, with separate phases of the harmonic excitation current applied to each delta; and a common set of delta-connected windings actuated through use of a multiphase inverter, with a separate phase of the harmonic excitation current applied to each delta.

BRIEF DESCRIPTION OF THE DRAWINGS

Other advantages of the invention will become apparent upon reading the following detailed description and upon reference to the drawings.

FIG. 1A depicts a sinusoidal flux distribution. FIG. 1B depicts a square wave flux distribution. FIG. 1C depicts a total flux distribution achieved by adding an increased level of fundamental flux distribution with a third harmonic flux distribution. FIG. 1D depicts a total flux distribution achieved by adding a further increased fundamental flux distribution with third and fifth harmonic flux distributions.

FIG. 2A depicts the flux distributions with the machine operated with neither of the magnetic members in saturation. FIG. 2B depicts how the flux distributions in a typical low speed machine can be adjusted through practice of the present invention to improve machine performance. FIG. 2C depicts how the flux distributions in a typical high speed machine can be adjusted through practice of the present invention to improve machine performance.

Figure 1A:
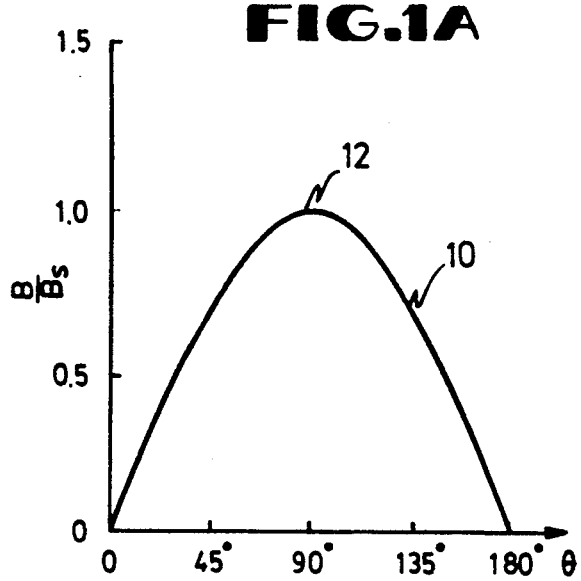
FIGS. 1A-D graphically depict the flux distribution in a section of the magnetic path of an AC machine.

While the invention is susceptible to various modifications and alternative forms, specific embodiments thereof have been shown by way of example in the drawings and are herein described in detail. It should be understood, however, that there is no intention to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

The present invention utilizes the injection of harmonic frequencies into the excitation current of a polyphase AC machine to optimize the flux densities in both the iron portions and the air-gap of the machine. Those skilled in the art recognize that the resulting increase in total flux in the machine yields improved performance of the machine.

Further, by controlling the phase angle between the fundamental and harmonic excitations, the flux density in selected iron portions of the machine is controlled to more efficiently utilize the flux potential of these selected iron portions, as well as the entire machine. When compared to conventional reluctance machines, this improved flux distribution results in similar torque output with lower flux per pole requirements. The reduced flux per pole permits the design of machines that have larger bore diameters and increased slot areas to generate higher machine ratings or to improve performance. These improvements are most beneficial to 2-pole reluctance motors; however, the invention is not limited to these machines.

Referring first to FIGS. 1A–D of the drawings, improved machine performance by increasing the total flux is discussed. Each Figure graphically depicts the total flux distribution in a section of the magnetic path of an AC machine under different conditions. The ordinate of each graph is the phase angle while the abscissa represents the ratio of the local flux distribution (B) to the maximum design flux density ($B_S$) in the machine.

Figure 1B:
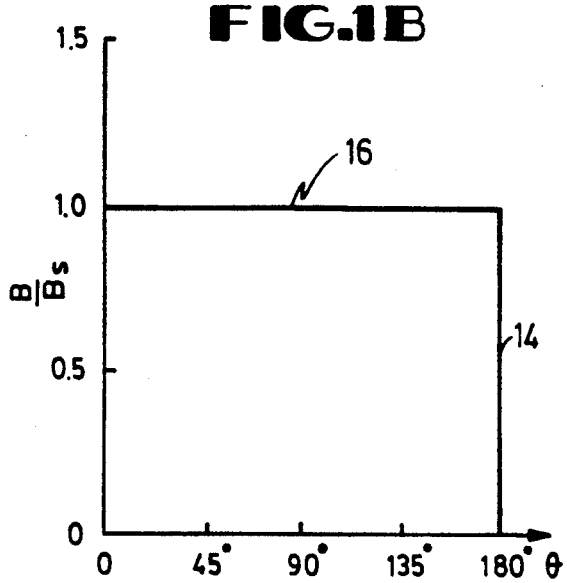

FIG. 1A depicts a sinusoidal flux distribution 10 in the magnetic path, resulting from a sinusoidal excitation current. Flux distribution 10 has a peak amplitude 12. FIG. 1B depicts a square wave flux distribution 14 having an amplitude 16 equal to the peak amplitude 12 of sinusoidal distribution 10 in FIG. 1A. The theoretical flux per pole of a machine actuated with the square wave flux distribution 14 of FIG. 1B is 1.57 times the flux per pole of a machine actuated by sinusoidal distribution 10 of FIG. 1A. Such a theoretical machine makes optimal usage of the flux capacity of the iron portions of the machine. Square waves, however, cannot be produced in practical machines because practical power supplies are not available.

A square wave can be synthesized by an infinite set of odd harmonics. Although such synthesization is impractical, a square wave can be approximated by a finite set of odd harmonics. FIG. 1C depicts a flux distribution 18 achieved by adding an increased fundamental flux distribution 19 to the flux distribution of the third harmonic 20. The flux per pole of flux distribution 18 is 1.23 times that of the sinusoidal flux distribution 10 resulting from only fundamental excitation.

Figure 1D:
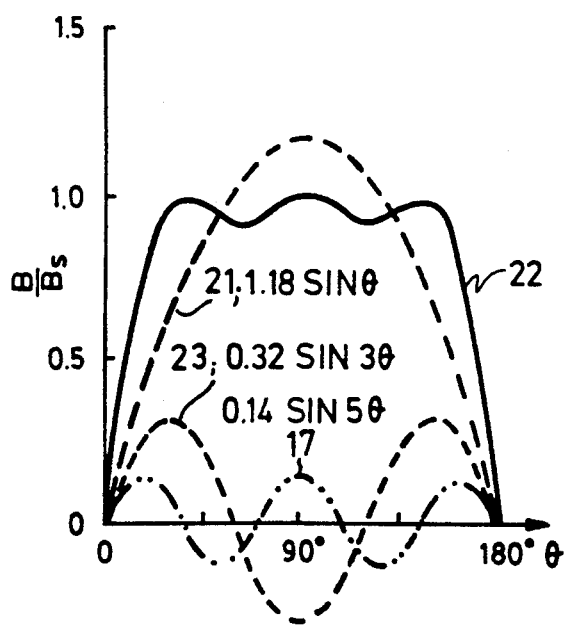
Figure 1C:
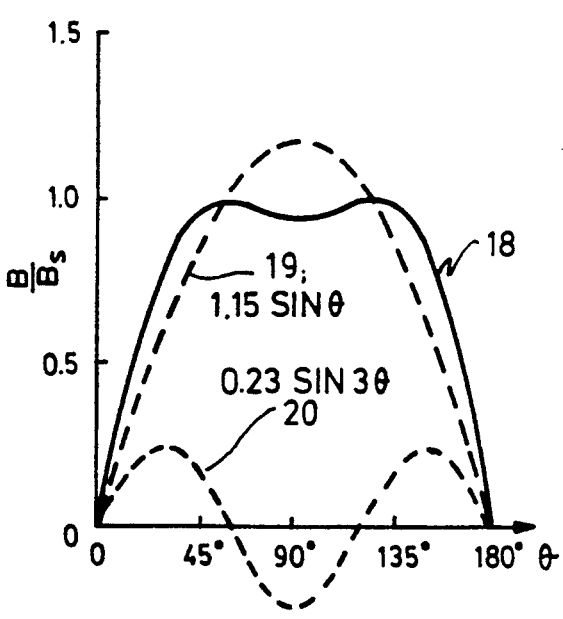

FIG. 1D depicts a flux distribution 22 achieved by adding a further increased fundamental flux distribution 21 to an increased third harmonic flux distribution 23 and a fifth harmonic flux distribution 24. The flux per pole of flux distribution 22 is 1.31 times that of sinusoidal flux distribution 10.

Additional correlated odd harmonic flux distributions allow further increases in the flux per pole relative to the sinusoidal flux distribution 10 resulting from fundamental excitation only. The further addition of these odd harmonic flux distributions approaches the flux per pole of square wave flux distribution 14. However, additional odd harmonic flux distributions yields smaller incremental changes than those provided by the addition of the third and fifth harmonics as depicted in FIGS. 1C and 1D. The addition of the third harmonic flux distribution facilitates the greatest increase in the total flux distribution and, therefore, is discussed here in the greatest detail.

Figure 3:
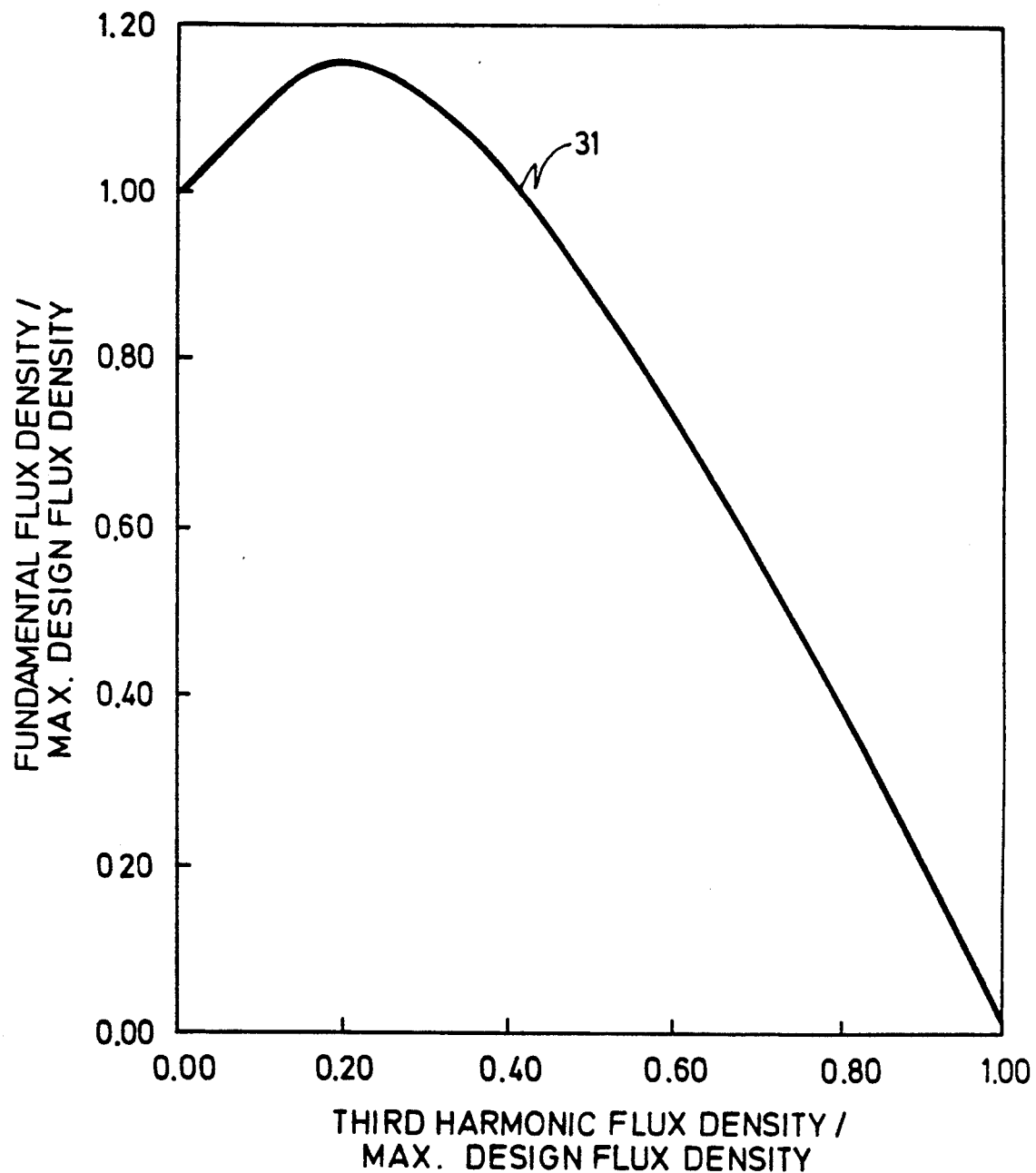
FIG. 3 graphically depicts the relationship between the ratio of the fundamental flux density to the maximum design flux density of a machine and the ratio of the third harmonic flux density to the maximum design flux density of the machine.

Referring now to FIG. 3, therein is graphically depicted, by a curve 31, the relationship between the fundamental flux density and the third harmonic flux density in a machine. The abscissa of the graph of FIG. 3 represents the ratio of the fundmental flux density to the maximum design flux density of a machine, while the ordinate represents the ratio of the third harmonic flux density to the maximum design flux density of the machine. The relation expressed in curve 31 assumes that the total flux density in the machine remains unchanged.

In determining the relative amplitudes for the fundamental and third harmonic excitation voltages, the maximum third harmonic voltage should be applied which facilitates the maximum fundamental voltage that can be applied to improve machine performance without exceeding the thermal rating of the machine. In addition to this primary parameter, however, the actual ratio between the fundamental and third harmonic excitation voltages may be affected by secondary factors, such as changes in core losses due to the excitation by both fundamental and third harmonic frequencies, or changes in deleterious naturally-occurring space harmonics as discussed earlier herein, etc. The amplitude and the relative phases of all excitations are synchronized to produce optimal flux densities as discussed in conjunction with FIGS. 1A-D.

Figure 2A:
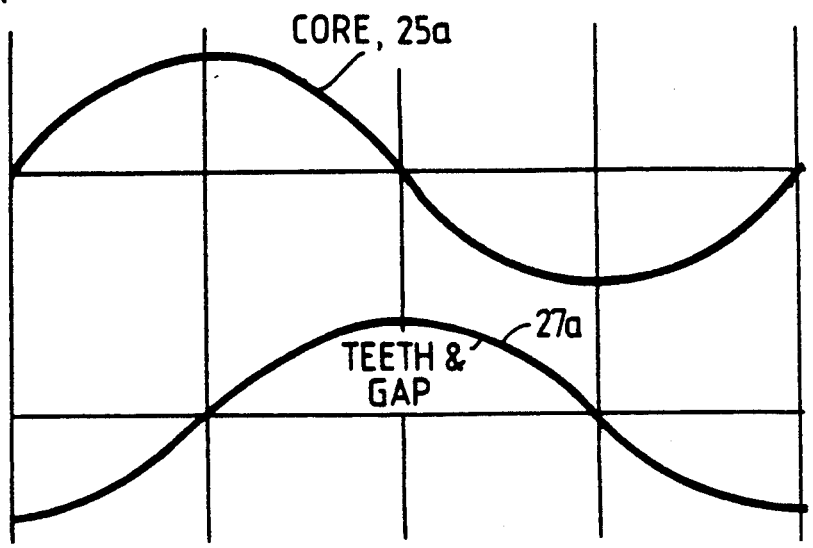
FIGS. 2A-C graphically depict the flux distributions in different portions of an AC machine.
Figure 2B:
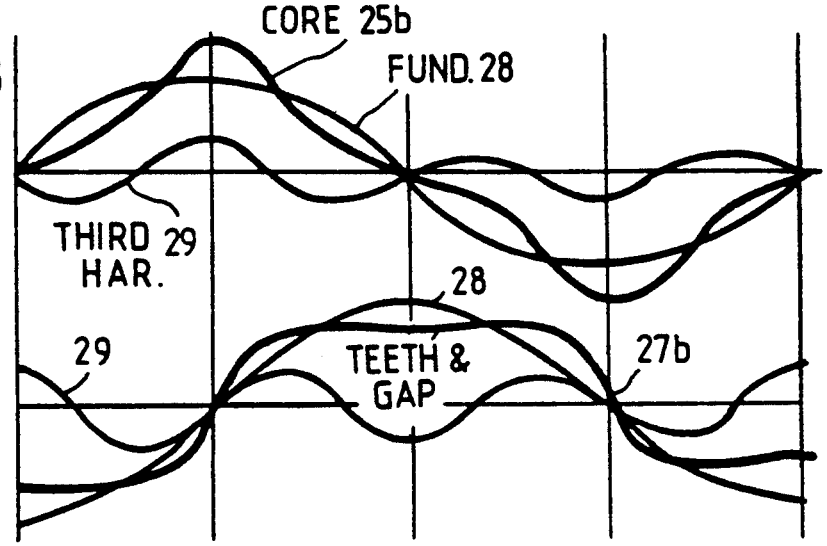
Figure 2C:
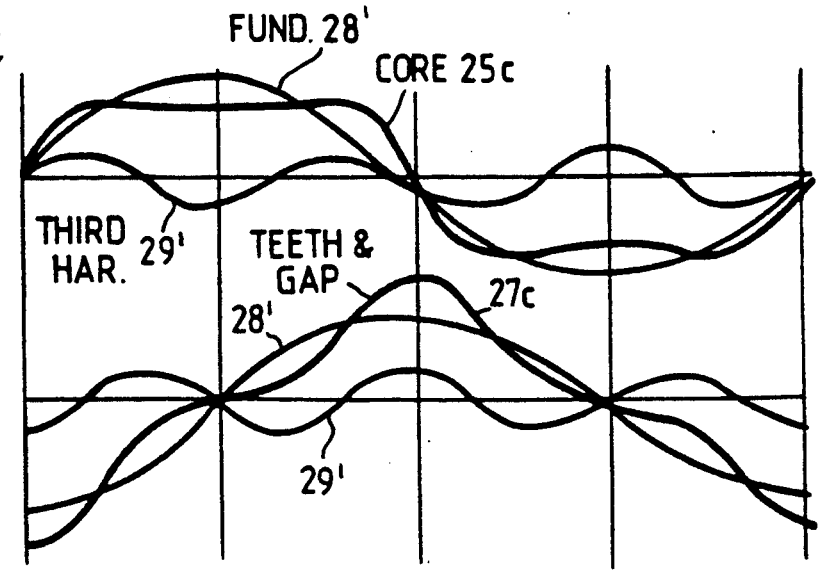

Referring now to FIGS. 2A-C, improved machine performance by controlling the phase angle between the fundamental and harmonic excitations is discussed. Graphically depicted in the FIGS. 2A-C are the core flux distributions 25a, 25b, and 25c respectively, and the teeth and gap flux distributions, 27a, 27b and 27c respectively, in a machine under three different conditions.

Conventional practice in the design of polyphase AC machines is to design the flux densities in the stator core, stator teeth, rotor core, and rotor teeth in such a way as to avoid excessive flux saturation in any particular section. This practice serves to limit magnetization current and core losses to acceptable values. It should be appreciated, however, that magnetic saturation of one of the iron portions limits the entire machine. For example, the flux level at which magnetic saturation of the teeth occurs sets the peak of the sine or square waves of FIGS. 1A-B. This, of course, results in under-utilization of the magnetic potential of the cores.

FIG. 2A depicts the core flux distribution 25a, and the teeth and gap flux distribution 27a of a machine wherein neither section of the machine is saturated. Each flux distribution is a sinusoid in response to the fundamental frequency excitation. Core flux distribution 25a is derived from integration of teeth and gap flux distribution 27a, and is, therefore, spaced 90 degrees from the teeth and gap flux distribution 27a.

In practice, a machine is operated with at least one iron portion of the machine approaching saturation. Further, the degree of saturation within these different iron portions is generally not equal. For example, in a low speed machine having a large number of poles, flux densities in the stator and rotor cores are much lower than the flux densities in the stator and rotor teeth. The reason is that the minimum dimension of each core is determined by mechanical requirements, such as rigidity, stress, and manufacturing requirements; but is not determined by electromagnetic requirements. In other words, the cores are physically large enough that greater electromagnetic energy is required to saturate them. Saturation of the teeth is, therefore, a determining factor for how much flux per pole can be produced in the machine. Conversely, for high speed machines, such as two pole machines, the core sections are typically more saturated than the teeth sections.

The performance, and therefore the rating, of an AC machine is dependent upon the total flux per pole that can be produced in the machine. The present invention increases the total flux per pole in a polyphase AC machine by maintaining or lowering flux density in one iron portion while increasing the flux density in another iron portion. This redistribution of the flux is accomplished by adjusting the phases of the harmonic excitation relative to the fundamental excitation.

For example, FIG. 2B depicts exemplary flux distributions contemplated through use of the present invention in a low speed machine as discussed above. The maximum density of the core flux 25b is increased through use of fundamental flux distribution 28 and third harmonic flux distribution 29. At the same time, however, the maximum density of the teeth and gap flux 27b is decreased relative to the fundamental flux distribution 28 and the third harmonic flux distribution 29. The injection of third harmonic excitation current to establish third harmonic flux distribution 29, therefore, facilitates increasing the maximum density of the core flux 25b while decreasing the maximum density of the teeth and gap flux distribution 27b, more evenly distributing the flux in the machine, and, most importantly, facilitating an increase in the total flux per pole in the machine.

FIG. 2C, depicts exemplary flux distributions contemplated through use of the present invention with a high speed machine as discussed above. In FIG. 2C, the phase angle of the third harmonic flux distribution 29' is changed relative to the fundamental flux distribution 28'. This results in a decrease in the maximum density of the core flux 25c and facilitates an increase in the teeth and gap maximum flux 27c. This again promotes a more even flux distribution within the machine and facilitates an increased total flux per pole in the machine.

Figure 19:
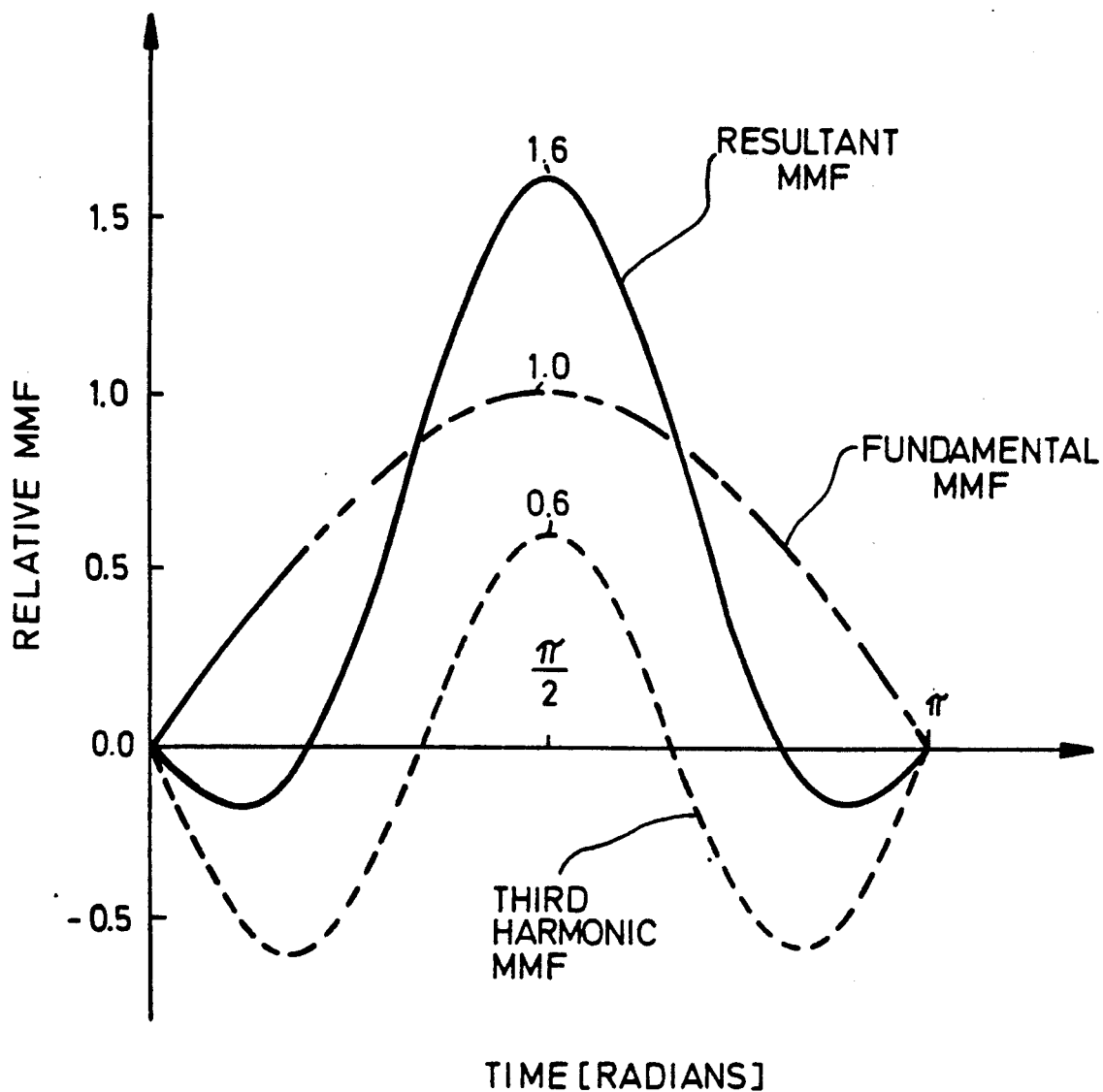
FIG. 19 graphically depicts the air-gap flux distribution resulting from the combination of the fundamental and third harmonic flux waves being 180 degrees (third harmonic degrees) out of phase with one another.
Figure 20:
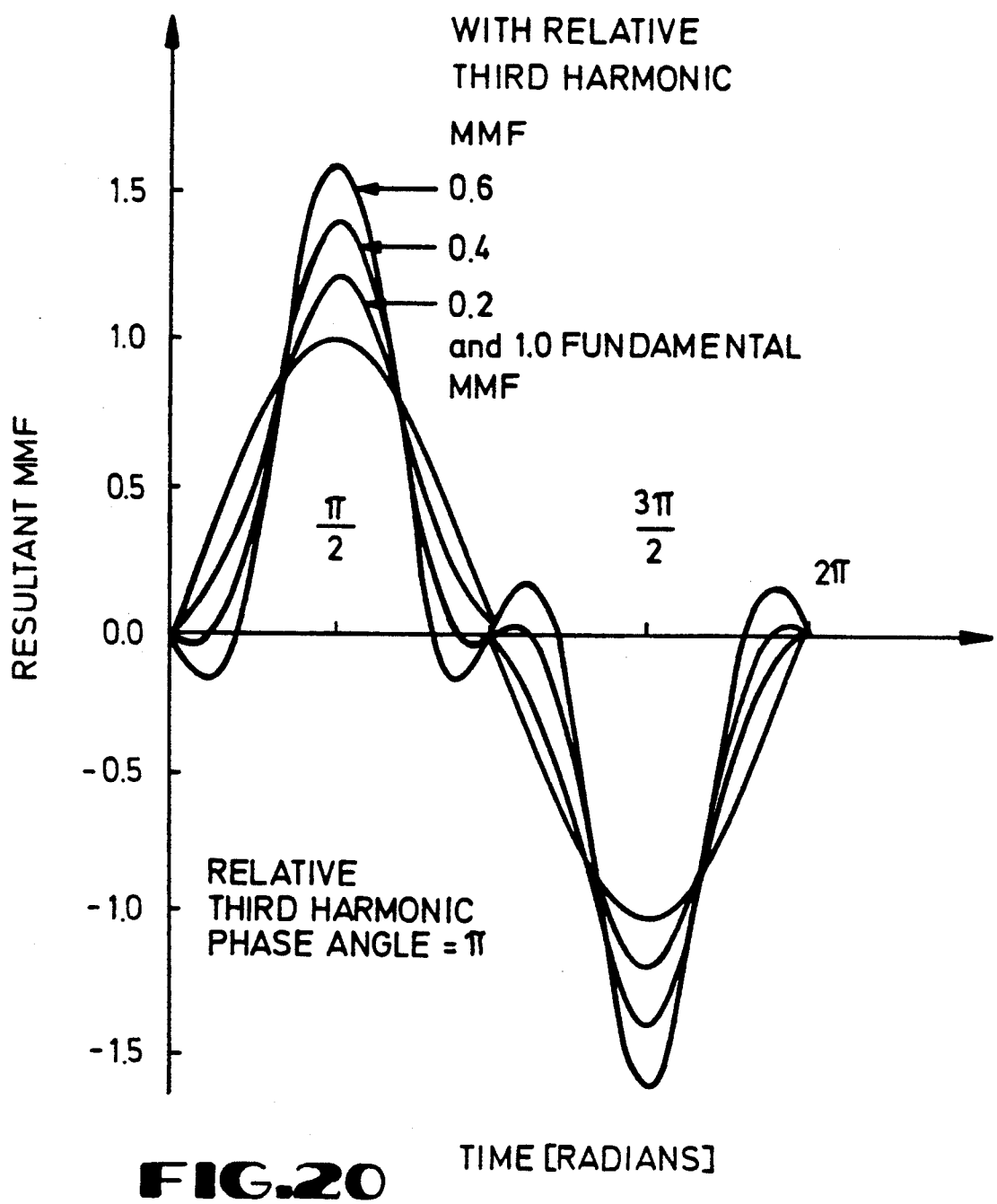
FIG. 20 graphically depicts the air-gap flux distribution for various amplitudes of third harmonic excitations.

FIG. 19 illustrates the desired phase relationship between the fundamental and third harmonic flux wave for a high speed reluctance motor, as discussed in conjunction with FIG. 2C. The teeth and air-gap flux waves corresponding to the fundamental and third harmonic frequencies are approximately 45 degrees (third harmonic degrees) out of phase with one another so as to produce a resultant peaked flux wave, which has a maximum amplitude of approximately 1.6. FIG. 19 shows that when there is a third-harmonic flux wave rotating at the same speed as the fundamental flux wave, the resultant air-gap flux wave is the sum of these two flux waves. FIG. 20 shows the resultant flux wave corresponding to 0.6, 0.4, and 0.2 third-harmonic relative amplitudes.

For a proper understanding of the instant invention, reference should be had to the various apparatus and methods for injecting the third harmonic excitation and controlling the phase relationship between the fundamental and third harmonic excitations. FIGS. 4–18 illustrate and discuss a variety of such methods and apparatus.

Following is a discussion of increased performance of different types of AC machines through use of the present invention. With respect to any of the below discussed polyphase AC machines, because harmonic sinusoids of different frequencies are orthogonal, the fundamental and each harmonic of the stator-produced flux wave interact to produce torque only with its counterpart in the rotor produced flux wave.

The benefits of the present invention may be achieved with different types of AC machines including, for example: squirrel cage induction motors, wound rotor induction motors, and both salient pole and round rotor synchronous machines. Different practical considerations with respect to the present invention are found with these different machines, however. A squirrel cage induction motor experiences enhanced torque production from the increased fundamental component facilitated through harmonic injection, as depicted in FIGS. 1C and 1D. Additionally, a squirrel cage induction motor experiences enhanced torque production from each harmonic flux component provided that the conductors forming the squirrel cage on the rotor are finely enough divided to allow each space harmonic of induced current to flow. If the number of bars is so small that one or more space harmonic currents cannot flow, then no torque is produced by those space harmonics in the stator flux wave.

In a wound rotor induction motor, the number of poles produced by the rotor winding is determined by the winding configuration on the rotor. As a consequence, torque is produced by each flux component in the armature for which there is a corresponding winding having a suitable number of poles on the rotor. For purposes of this discussion, the armature has a fundamental winding and one or more harmonic windings. If the rotor has only a fundamental winding, the machine experiences enhanced torque from the higher armature fundamental flux density component as seen in FIGS. 1C and 1D. However, if the rotor includes windings having the correct number of poles to interact with the armature harmonic flux distributions, additional torque is produced by each of these flux distributions also.

With respect to synchronous machines, torque is produced by the interaction of fields produced by the armature excitation with the steady fields produced by direct current in the field winding. The field winding is typically located on the rotor. Space harmonics in the flux wave produced by current in the field winding can be produced by properly shaping the poles in a salient pole machine, or by properly distributing the field winding in a round-rotor machine. If current in the field winding produces only a fundamental component of flux density, torque enhancement results only from the increased armature fundamental flux component made possible by the harmonic components in the flux wave. However, for each harmonic component in the field-produced flux wave that matches a harmonic in the armature flux wave, further torque enhancement occurs. In a salient pole synchronous machine, if the salient poles are properly shaped, then additional torque is produced by the harmonic components of the flux wave.

With respect to enhanced performance of any particular machine, any actual increase in the machine's rating must be determined through examination of the factors that initially set the rating, i.e., electrical heating of the armature winding, electrical heating of the rotor winding in an induction machine, electrical heating of the field winding in a synchronous machine, core loss heating of the magnetic members, and/or mechanical strength of machine components.

In one embodiment of the present invention, flux distributions, as depicted in FIGS. 1C or 1D or alternatively FIGS. 2B or 2C, are produced by providing separate sets of polyphase windings for the fundamental and for each desired harmonic. Each harmonic, thus, is applied to a discrete set of windings. Alternatively, and preferably, however, the fundamental winding is utilized also for harmonic excitation. This can be accomplished in a variety of ways. For example, in one method of practicing the present invention, the outputs of two multiphase power supplies are coupled together in series to provide fundamental and harmonic excitation of the fundamental winding. Another method utilizes delta-connected windings coupled together through volt-amp balancers to balance the potential and currents of both fundamental and harmonic excitation in the windings. Yet another alternative method utilizes a single winding with a multiphase inverter, as often found with adjustable speed devices, to inject the harmonic excitations onto the fundamental winding.

Figure 4:
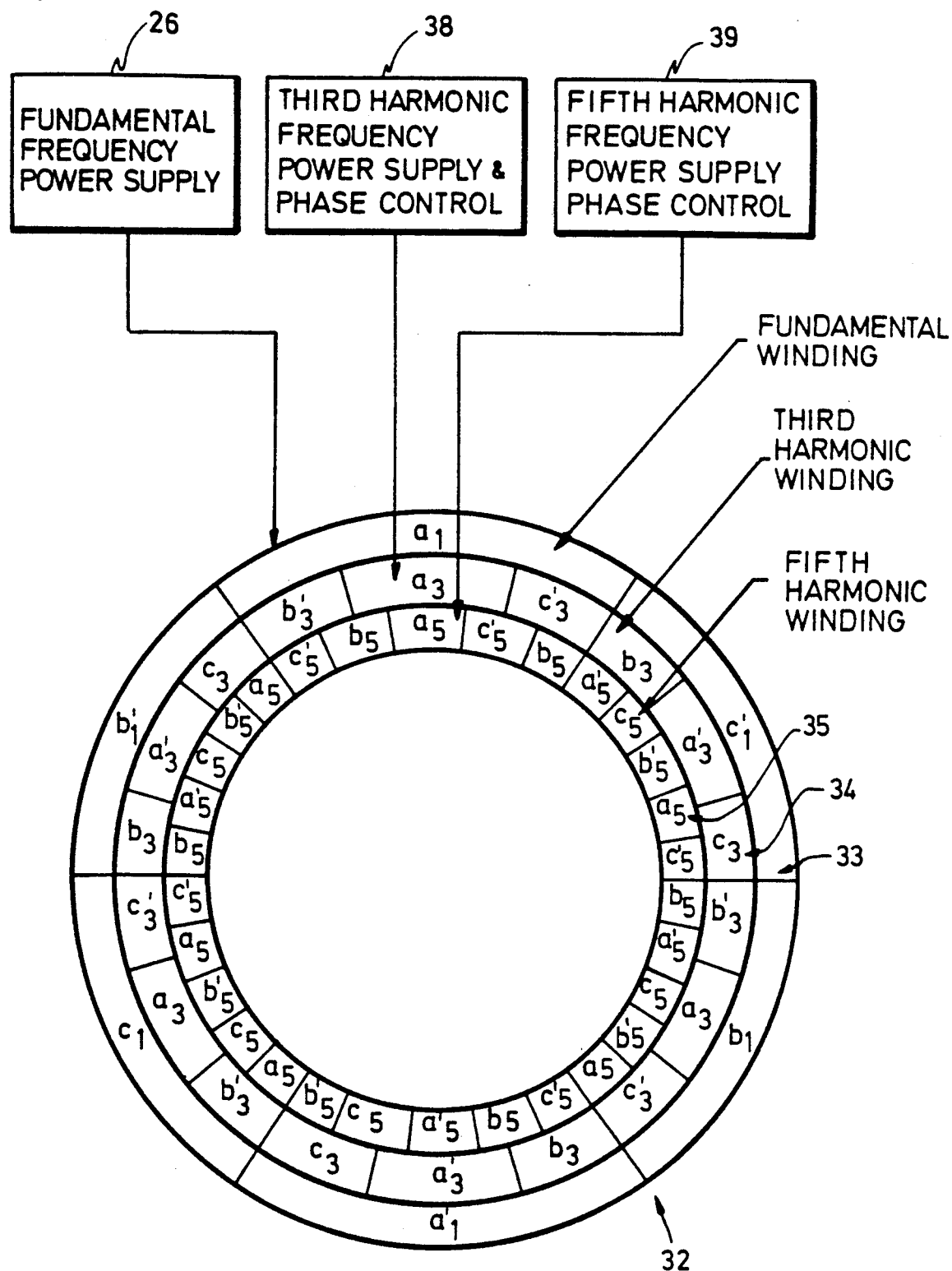
FIG. 4 schematically depicts the phase belts for a machine in accordance with the present invention having separate windings for fundamental, third harmonic and fifth harmonic frequencies and power supplies for exciting such machine.

Referring now to FIG. 4, therein is depicted in schematic form the cross section of phase belts for a machine 32 for excitation by fundamental, third harmonic, and fifth harmonic frequencies and the power supplies for exciting machine 32. Machine 32 is wound with a two-pole, three-phase fundamental winding 33 that is excited by a fundamental frequency supply 26. Third harmonic winding 34 is a six-pole, three-phase winding that is be excited by third harmonic frequency supply 38. Third harmonic frequency supply 38 contains phase control circuitry as known in the art to assure that the third harmonic frequency is maintained in the desired phase relationship with the fundamental frequency. Fifth harmonic winding 35 is a ten-pole, three-phase winding that is be excited by fifth harmonic frequency supply 39, which also contains phase control circuitry.

A specific phase winding in machine 32 extends between a pair of letters in a single winding ring, either 33, 34 or 35, indicated by that letter and its prime. For example, in the winding schematic the phase winding extending between a and a' in fundamental winding ring 33 is a single phase fundamental winding. Similarly, the third harmonic windings a to a' in winding ring 34 represent third harmonic phase belts. Pairs of third harmonic windings are connected either in series or parallel or are switched from one connection to the other for ease in starting.

As discussed above, in machine 32 the fundamental winding 33, third harmonic winding 34, and fifth harmonic winding 35, are excited by a separate three phase power supply, 26, 38, and 39, respectively. As determined above, the frequency of the third harmonic excitation current is three times the fundamental frequency, and the frequency of the fifth harmonic excitation current is five times that of the fundamental frequency. The three frequencies are phase controlled to be synchronized with one another as depicted, for example, in FIG. 1D.

Each harmonic winding must have a number of poles ($P_h$) equal to:

$$P_h = np \qquad (1)$$

where:

n is the order of the harmonic (third, fifth, etc.); and
p is the number of poles in the fundamental winding.
For example, for an armature having a fundamental winding having four poles (p=4), the third harmonic winding must have 3×4=12 poles. The fundamental winding is excited at the fundamental frequency, w, and each harmonic winding is excited at its harmonic of the fundamental, i.e., a third harmonic winding is excited at the electrical frequency, 3w. As is discussed in more detail later herein, although the number of phases in the fundamental winding and in each harmonic winding must be two or more, the number of phases need not be the same for all windings.

This embodiment allows the greatest flexibility in choosing coil pitches and numbers of turns for the windings. This construction, however, requires that an armature slot be occupied by at least two different windings, thereby resulting in less efficient utilization of the slot area. Because of the less efficient utilization of the slot area by the multiple windings, this method typically results in less percentage improvement than do other methods as will be discussed later herein.

For two-phase systems, the displacement of the fundamental and third harmonic power supplies are 90 degrees. For three or more phase systems, the phase displacements of the fundamental and the harmonic frequency supplies are 360/n electrical degrees for n number of phases.

Because the number of poles for the fundamental automatically determines the required number of poles for the space harmonic windings, in a machine where separate windings are provided for the fundamental and for the harmonic excitation currents, the appropriate number of phases for the harmonic excitation is determined by the number of slots per pole available for the harmonic windings. Table 1 indicates the slot requirements of both fundamental and third harmonic windings for polyphase machines:

TABLE 1

| $PH_f$ | $S_{pf}$ | $S_{pPHf}$ | $PH_3$ | $S_{p3}$ | $S_{pPH3}$ |
|---|---|---|---|---|---|
| 2 | 6 | 3 | 2 | 2 | 1 |
| 3 | 6 | 2 | 2 | 2 | 1 |
| 6 | 6 | 1 | 2 | 2 | 1 |
| 3 | 9 | 3 | 3 | 3 | 1 |
| 9 | 9 | 1 | 3 | 3 | 1 |
| 2 | 12 | 6 | 2 | 4 | 2 |
| 3 | 12 | 4 | 4 | 4 | 1 |
| 4 | 12 | 3 | 4 | 4 | 1 |
| 6 | 12 | 2 | 4 | 4 | 1 |
| 12 | 12 | 1 | 4 | 4 | 1 | where:

$PH_f$ indicates the number of phases of the fundamental frequency;
$S_{pf}$ indicates the slots per pole required for the fundamental winding;
$S_{pPHf}$ indicates the number of slots per pole per phase for the fundamental winding;
$PH_3$ indicates the number of phases of the third harmonic frequency;
$S_{p3}$ indicates the number of slots per pole required for the third harmonic winding; and
$S_{pPH3}$ indicates the number of slots per pole per phase for the third harmonic winding.

Those skilled in the art recognize that in addition to the integral slot per pole per phase distributions indicated in Table 1, fractional slots per pole per phase may be utilized.

Figure 5:
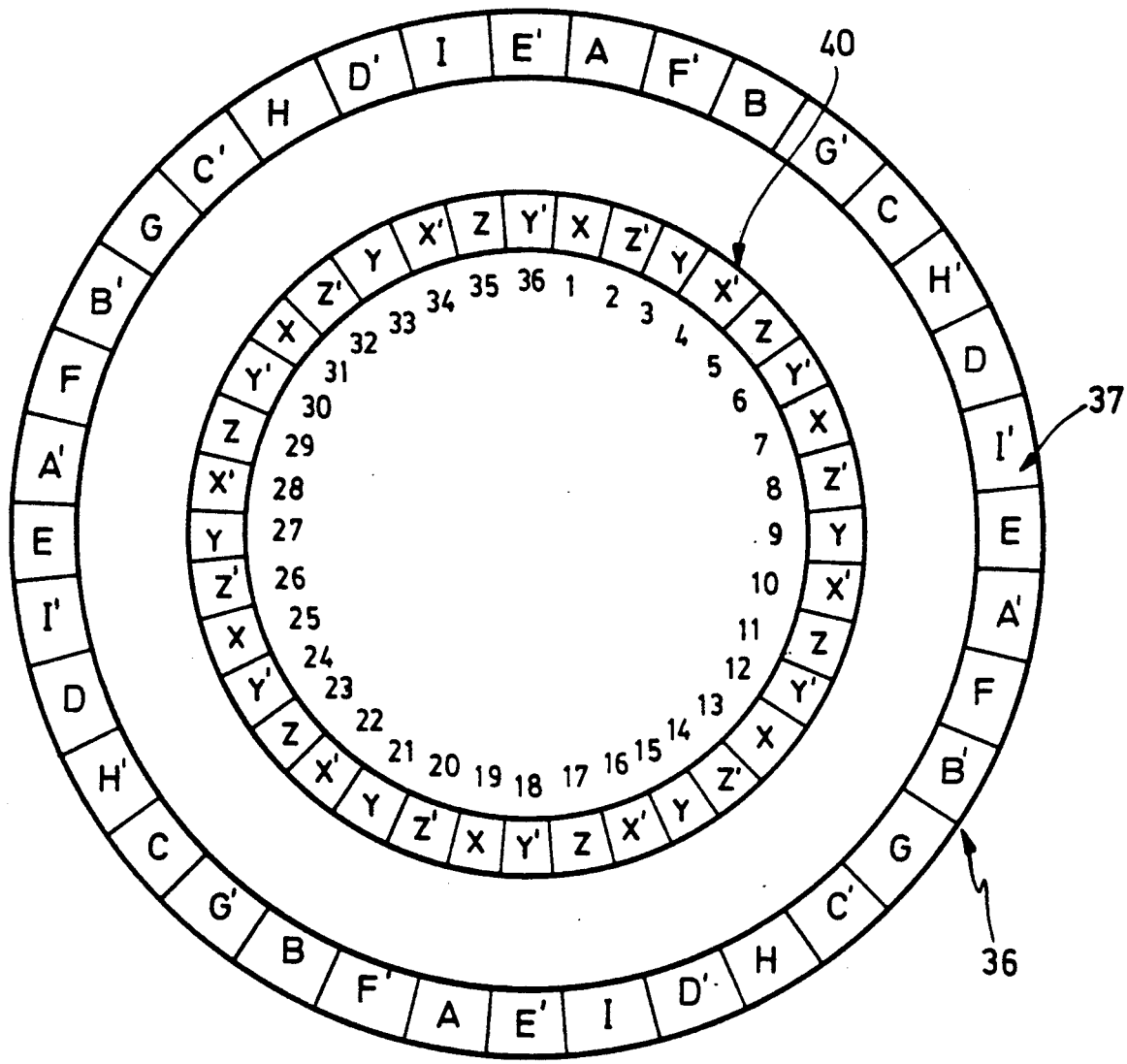
FIG. 5 schematically depicts a single layer winding for a machine in accordance with the present invention to be excited through combined fundamental and third harmonic power sources.

As indicated earlier herein, harmonic frequencies may be injected through use of a single winding for both fundamental and harmonic excitation. FIG. 5 schematically depicts in winding ring 37 a single layer winding for a four-pole, full pitch machine 36 having 36 slots. Machine 36 is preferably excited by a balanced nine-phase fundamental current. Accordingly, as determined by equation 1, machine 36 has three-phase, twelve-pole third harmonic excitation. Fundamental windings are indicated by the pair of a letter and its prime, with a subscript indicating the slot position of the winding. For example, the winding between, A, in slot 1, and A', in slot 10, is designated as $A_1$-$A'_{10}$.

Figure 6:
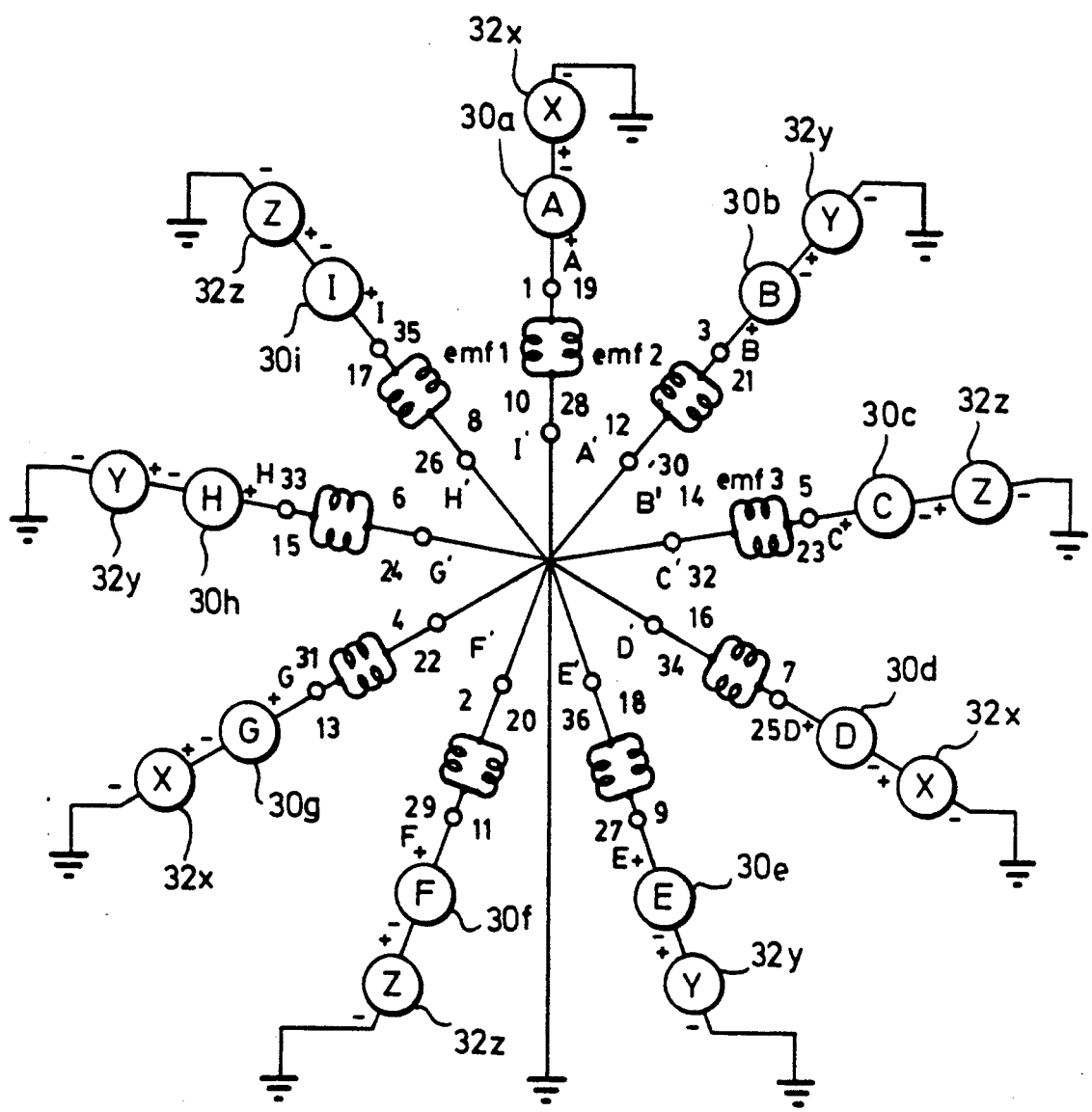
FIG. 6 depicts the power source connections to the machine of FIG. 5.

FIG. 6 depicts the power supply connections to the indicated windings of machine 36 of FIG. 5. Transformer secondaries A–I, indicated as 30a, 30b, ... 30i, are the secondaries of one or more transformers coupled to an appropriate nine-phase fundamental frequency power supply. Those skilled in the art recognize that a balanced nine-phase fundamental frequency supply may be obtained from a three-phase fundamental frequency supply through use of an appropriate number of transformers; typically, three transformers, each with four appropriately wound secondaries. Third harmonic frequency sources x–z, are preferably the secondaries of transformers 32x, 32y, and 32z, each coupled to one phase of a three-phase third harmonic frequency power supply. Alternatively, however, the three-phase third harmonic frequency power supply is coupled directly to secondaries 30a–30i in the manner indicated. In each arm of the star connection of FIG. 6, a secondary of the three-phase third harmonic frequency power supply 32 is coupled between ground and a nine-phase fundamental frequency supply secondary 30, and to a pair of fundamental windings. The fundamental windings are identified by the slot numbers of machine 36 as indicated in FIG. 5. For example, as shown in FIG. 6, three-phase secondary 32x is coupled in series between ground and nine-phase secondary 30a. The other side of nine-phase secondary 30a is then coupled to windings $A_1$-$A'_{10}$ and to $A_{19}$-$A'_{26}$. In machine 36 of FIGS. 5 and 6, the winding pairs $A_1$-$A'_{10}$ and $A_{19}$-$A'_{26}$ are connected in parallel between nine-phase secondary 30A and ground. Alternatively, winding pairs $A_1$-$A'_{10}$ and $A_{19}$-$A'_{26}$ are connected in series with one another between nine-phase secondary 30a and ground. Such series connection approximately doubles the voltage required by machine 36 while halving the required current.

Ring 40 in FIG. 5 depicts the third harmonic phasers assigned to each slot of machine 36. The effective third harmonic excitations shown, (i.e., $X_1$-$X'_4$, $X_7$-$X'_{10}$; etc.) do not represent actual windings, but rather the third harmonic phaser distributions achieved through application of power as depicted in FIG. 6 to the fundamental windings arranged as in FIG. 5.

Figure 7:
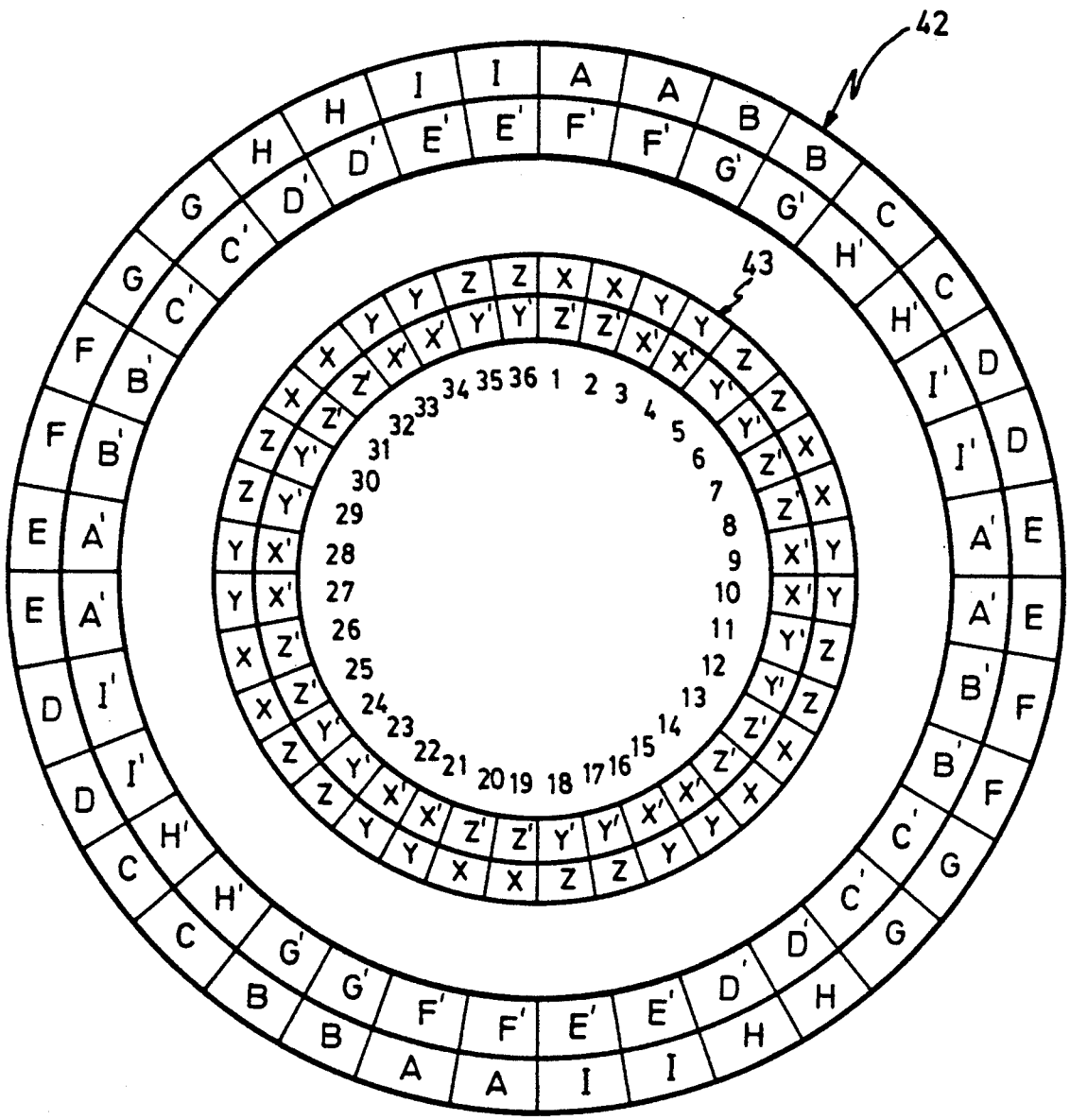
FIG. 7 schematically depicts a machine in accordance with the present invention having double layer windings with a per-unit pitch of less than 1.

The present invention is also employed with a multiple layer winding as opposed to the single layer winding utilized with machine 36 in FIGS. 5 and 6. The winding connections for a machine 42 with a double layer winding are schematically depicted in FIG. 7. Additionally, the principles of the present invention are applied to a machine having less than a full pitch.

As indicated above, machine 36 of FIGS. 5 and 6 is a four-pole, thirty-six slot, full-pitch machine. A full-pitch machine is preferable for use with the present invention because an optimal increase in machine performance is realized through practice of the invention with a full pitch machine. However, those skilled in the art realize that the fundamental excitation of some full pitch machines is more prone to generate undesirable fifth and seventh harmonics with such a phase relationship to the fundamental that machine performance is hindered, as discussed earlier herein. The coil pitch of a conventional machine is therefore often designed to be 0.83 so as to minimize these undesirable fifth and seventh space harmonics.

The fundamental coil pitch factor is determined by the relationship:

$$\cos[(\text{full pitch-actual pitch})/\text{full pitch} \times 180/2] \quad (2)$$

The third harmonic coil pitch factor for a single winding is determined by the relationship:

$$\cos[(\text{full pitch-actual pitch})/\text{full pitch} \times 3 \times 180/2] \quad (3)$$

Table 2 indicates the pitch factors for both the fundamental and the third harmonic for a double layer winding as determined through use of equations 2 and 3.

TABLE 2

| Actual Pitch | Per-Unit Pitch | Fundamental Pitch Factor | 3rd Harmonic Pitch |
|---|---|---|---|
| 9 slots | 1.00 | 1.00 | 1.00 |
| 8 slots | 0.89 | 0.98 | 0.87 |
| 7 slots | 0.78 | 0.94 | 0.50 |
| 6 slots | 0.67 | 0.87 | 0.00 |

FIG. 7 depicts a 36 slot machine 42 having a four-pole fundamental and a twelve-pole third harmonic, but with a 0.89 per unit pitch and a double layer winding. Windings are represented in FIG. 7 in the same manner as with FIG. 5, i.e., windings are represented by pairs $A_1$-$A'_9$; $B_3$-$B'_{11}$, etc. Phase windings in adjacent pairs of slots, for example $A_1$-$A'_9$ and $A_2$-$A'_{10}$ are connected in parallel. Inner ring 43 does not represent actual windings of machine 42, but rather, the third harmonic phase distribution of machine 42. Machine 42 is excited by power connections similar to those depicted in FIG. 6 for machine 36, with the addition of additional connections to the dual windings in each slot of machine 42.

A third method of practicing the present invention involves the use of volt-amp balancers. This method allows the use of three-phase power supplies to provide the fundamental and third harmonic excitation. With this method the machine windings are delta-connected. Coupled to each delta is one phase of the three phase third harmonic excitation current. Each leg of each delta preferably contains the secondary of a transformer (54a, 54b, 54c; 56a, 56b, 56c; 58a, 58b, 58c in FIG. 10), each of which has a primary coupled to one phase of the third harmonic frequency power supply. As previously discussed, the frequency of the third harmonic excitation current is three times that of the fundamental excitation current.

Autotransformers used in the volt-amp balancers of the power connections for this method yield variations of resistance and leakage-reactance between full load on the machine and no load. However, for purposes of illustration of this embodiment, ideal conditions are assumed, in which the excitation current, the leakage reactances, and the resistances of both the volt-amp balancers and the third harmonic transformers are neglected. Under this assumption, the terminal voltage of a winding is equal to the back emf produced by the fundamental air-gap flux. These assumed ideal conditions are generally representative of a no load condition of a large rating machine, whose no load currents are typically small compared to their full load currents.

Figure 8:
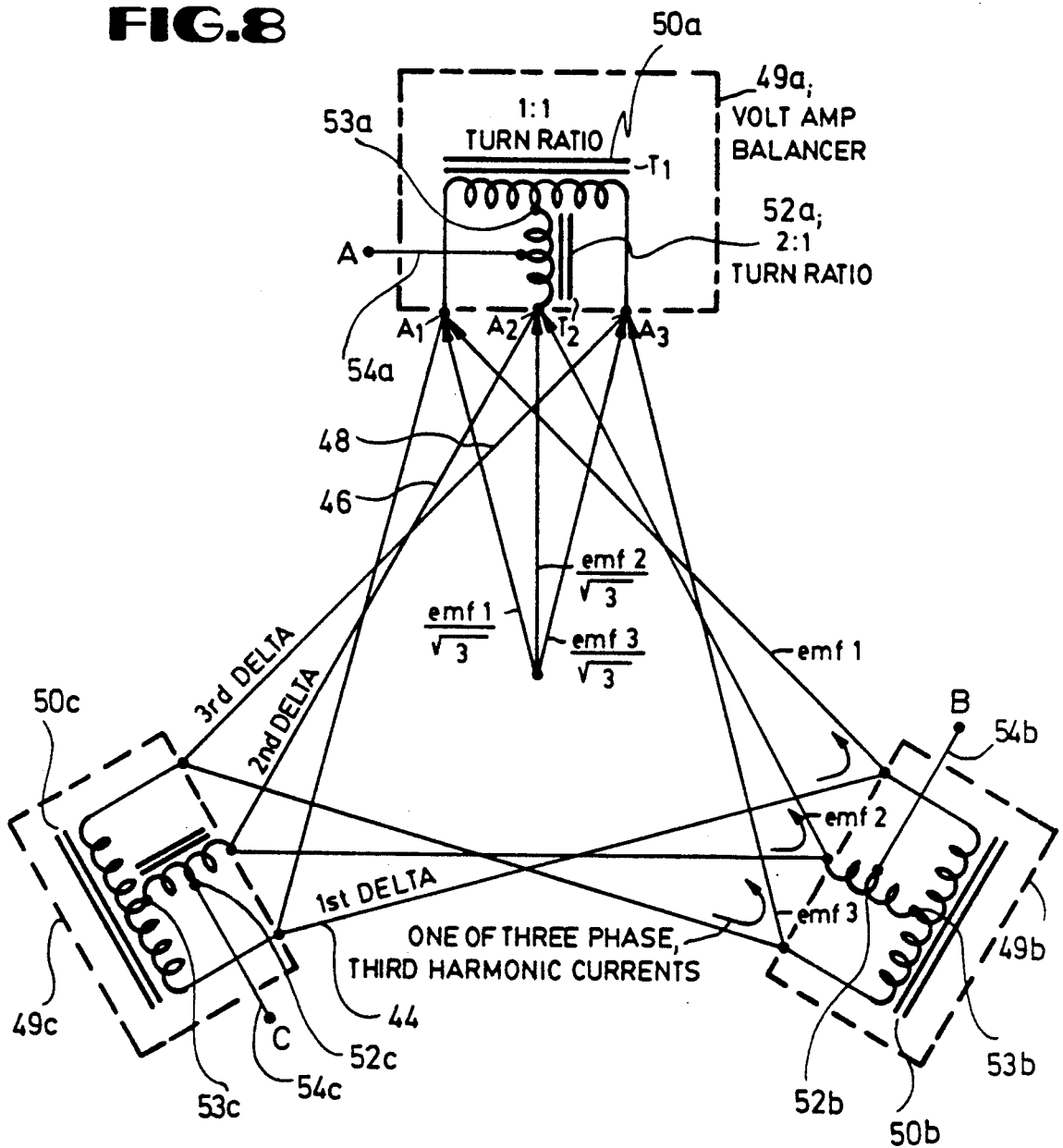
FIG. 8 depicts the connections and the back emf potential points for a machine when such machine is excited through use of volt-amp balancers.
Figure 9:
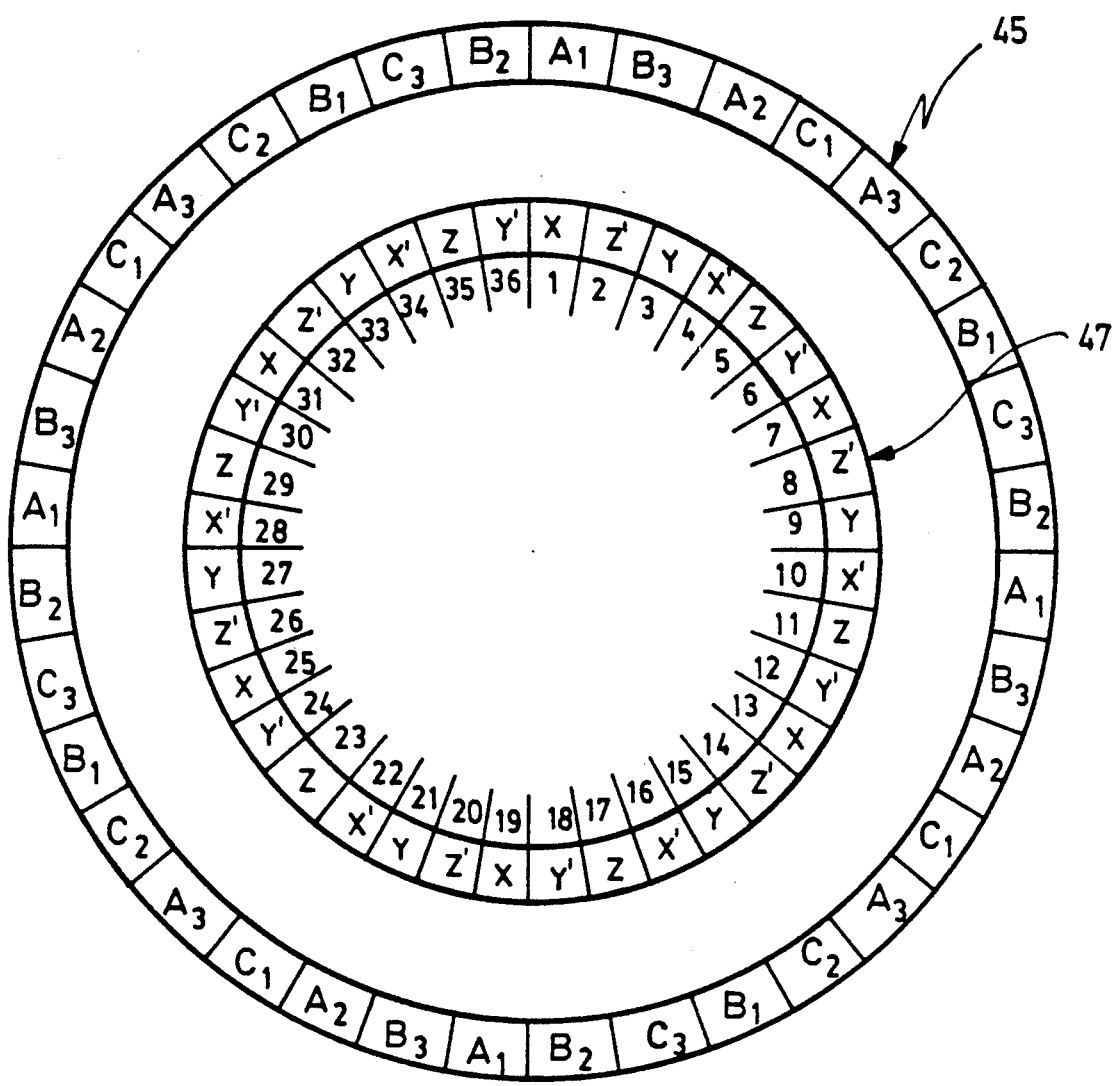
FIG. 9 depicts the slot electrical connections for a machine to be excited as in FIG. 8.
Figure 10:
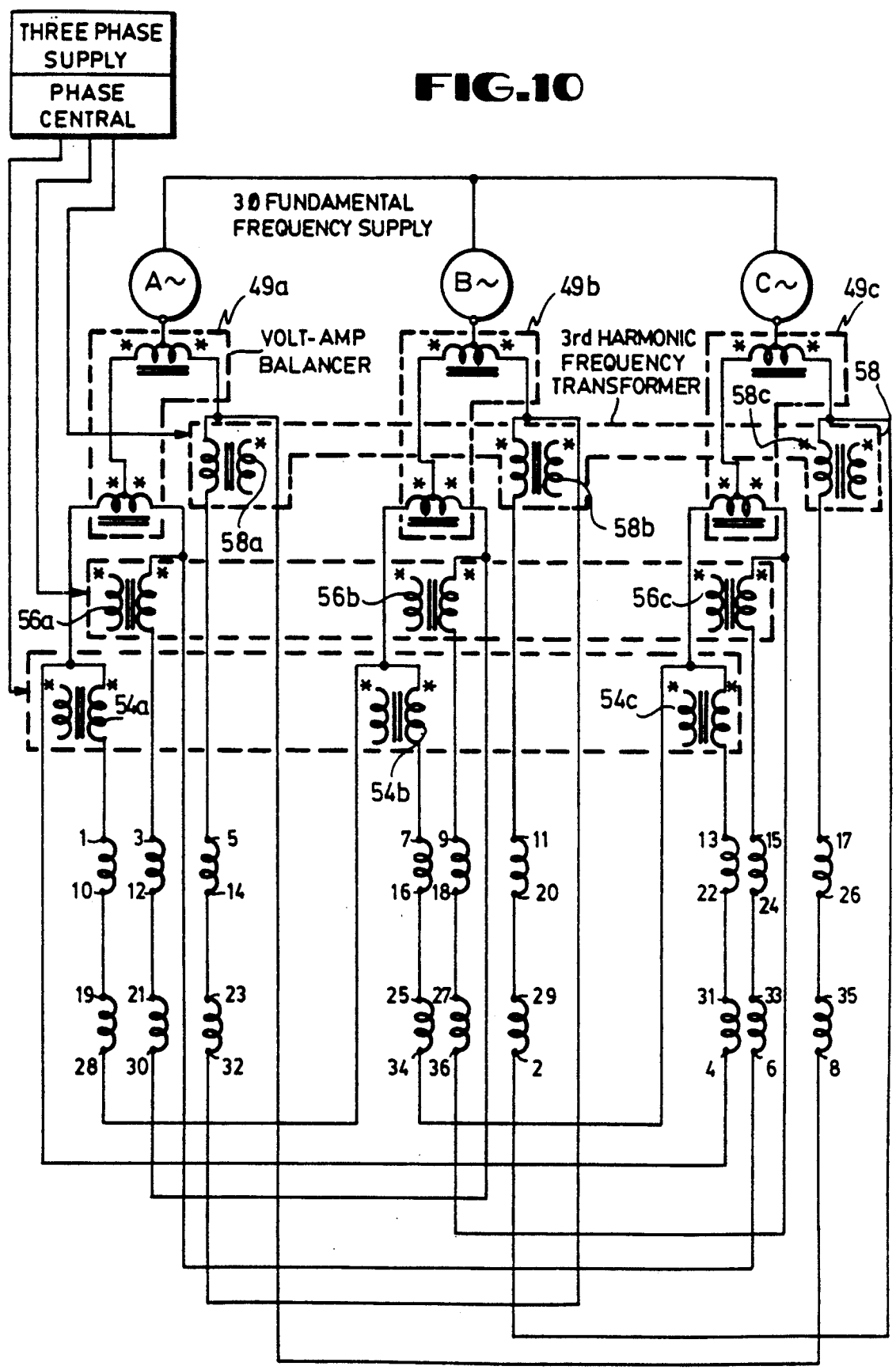
FIG. 10 schematically depicts the connections for the machine of FIGS. 8–9.

FIG. 8 depicts the connections and the back emf potential points ($A_1$, $A_2$, and $A_3$) for exciting a machine 45, as depicted in FIG. 9. Machine 45 is a four-pole, three-phase machine, having 36 slots and 120~ phase belts. FIG. 10 schematically depicts the particular slot electrical connections for the connections depicted in FIG. 8. Inner ring 47 of FIG. 9 depicts the third harmonic phaser distribution of machine 45 when machine 45 is excited through the connections as shown in FIGS. 8 and 10.

With this volt-amp balancer method of harmonic injection, the number of phases of the third harmonic is determined by the number of slots per third harmonic pole by means of the relationship:

$$N_{ph3} = \text{the smallest multiplier greater than 1 of} \\ [n_s/(3 \times P_f)] \quad (4)$$

where:

$N_{ph3}$ equals the number of third harmonic phases;
$n_s$ equals the number of slots in the machine; and
$P_f$ equals the number of poles of the fundamental frequency.

In machine 45, coupled as depicted in FIGS. 8 and 10, 120 degree phase belt slots 1, 3 and 5, etc. correspond to the three discrete phases of third harmonic excitation. Each phase of the three-phase third harmonic current is a zero-sequence current with respect to a particular fundamental delta winding. The back emf's: emf 1, emf 2, and emf 3, of the fundamental frequency (in slots 1, 3 and 5, etc.) each have the same amplitude. Because the phases of these three currents are different, coils in slots 1, 3 and 5, etc. can not be directly connected, either in parallel or in series.

In the connections of FIG. 8, three volt-amp balancers 49a, 49b, and 49c are used, one for each phase of the fundamental frequency current. Each volt-amp balancer is formed of two autotransformers: T1, indicated as 50a, 50b and 50c, and T2, indicated as 52a, 52b and 52c. The turn ratio of transformers T1 (50a, 50b and 50c), is 1:1. The turn ratio of each transformer T2 (52a, 52b and 52c), is 2:1. The sides of each transformer T1 are connected to a terminal potential point A1 or A3 of first delta 44 or third delta 48, respectively. Autotransformer T2 is connected between terminal potential point A2 of second delta 46 and the center tap 53 of its respective transformer T1. Line current of phase A is coupled to the tap 54a, of autotransformer T2, 52a. Because the turn ratio of autotransformer T2 is 2:1 relative to tap 54a, the line current of phase A conveys one portion to terminal A2 of second delta 46 and two portions into center tap 53a of transformer T1, 50a. Similarly, because the turn ratio of each autotransformer (T1) 50a, 50b and 50c is 1:1, the current into the terminal potential point A3 of third delta 48 is the same as that going into the terminal potential point A1 of first delta 44. Accordingly, the line currents entering terminal potential points A1, A2, and A3 of first, second and third deltas 44, 46, and 48, respectively are identical. As a result, the phase current drive is identical for each phase.

In operation of the embodiment depicted in FIGS. 8-10, the back emf's at terminal points A1 and A3 are balanced by transformers (T1) 50a, 50b and 50c. The potential at terminal potential point A2 and at the center tap of autotransformer T1 are balanced by each autotransformer T2, 52a, 52b and 52c. As indicated above, each third harmonic current appears as a zero-sequence current relative to a particular fundamental current. Accordingly, the volt-amp balancers see only the fundamental frequency currents and voltages. The back emf voltages are therefore maintained in the same amplitudes, but in different phases, through operation of volt-amp balancers 49a, 49b, 49c. The net effect of this connection is that the flux wave produced is the same as that which would be produced with the coils of slots 1, 3 and 5 connected in series.

Figure 11:
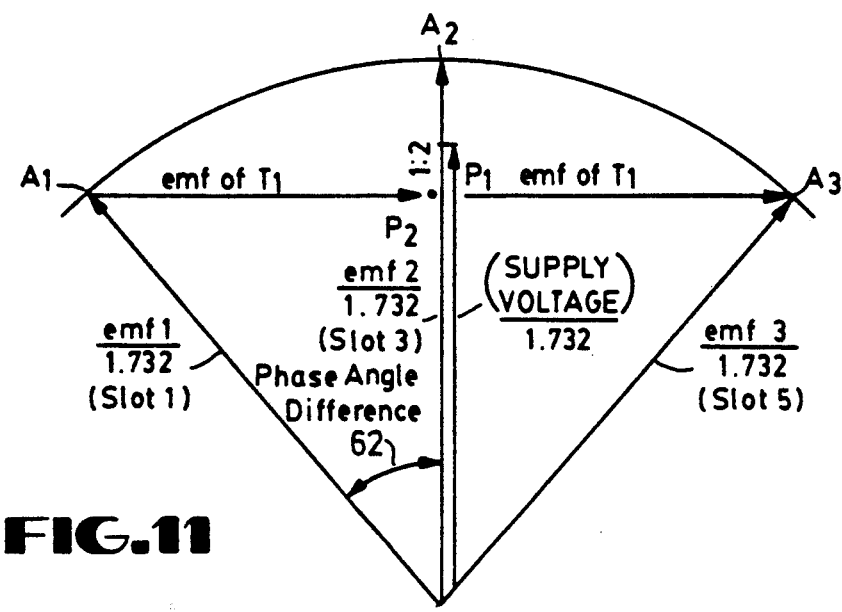
FIG. 11 depicts the fundamental frequency back emf voltage differences between harmonic phases found in alternate slots in the machine of FIGS. 8–10.

The fundamental frequency back emf voltage difference between the harmonic phases found in alternate slots, slots 1, 3 and 5, etc., are related as shown in the vector diagram of FIG. 11. As can be seen in FIG. 11, the back emf's in each delta 44, 46, 48 are of equal magnitude, but have a phase angle difference of 40 degrees. The volt-amp balancers balance these phase differences, which occur between alternate slots in machine 45. As one skilled in the art can calculate, the total volt-ampere rating of volt-amp balancers 49a, 49b and 49c, is 0.37 that of the transformers required to provide the nine-phase fundamental frequency supply discussed in relation to the system of FIGS. 5 and 6. The results actually achieved with a machine excited through use of volt-amp balancers will depart somewhat from the ideal performance shown and described. This departure is due in large part to winding resistance and leakage reactance in the volt-amp balancers and harmonic frequency transformers. Accordingly, in the design of components for any particular system, the transformers for the volt-amp balancers and third harmonic excitation should be designed with sufficiently low winding resistance and leakage reactance to minimize departure from the ideal.

Figure 12:
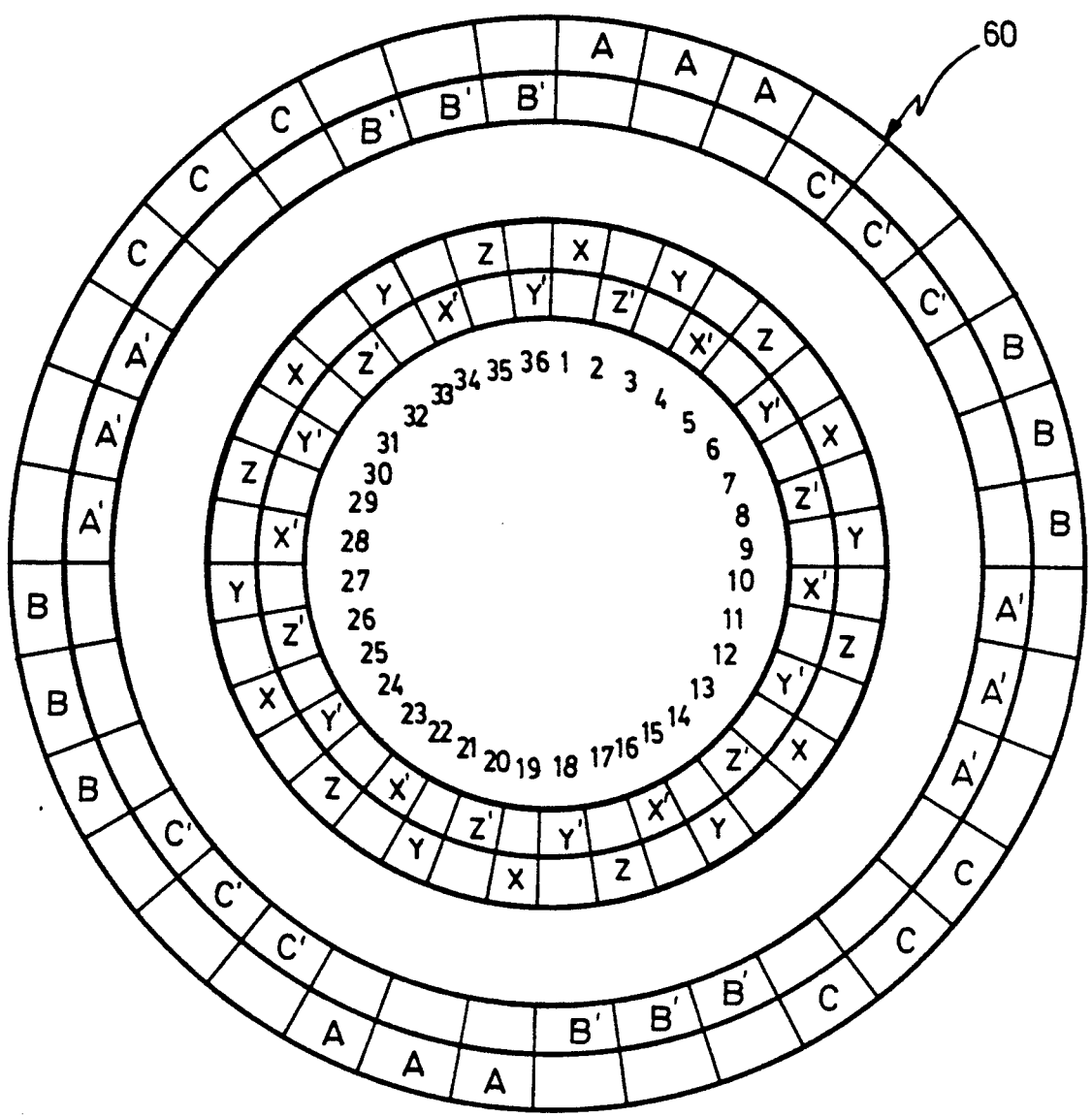
FIG. 12 schematically depicts a machine with 60⁻ phase belt connections for excitation through use of volt-amp balancers.
Figure 13:
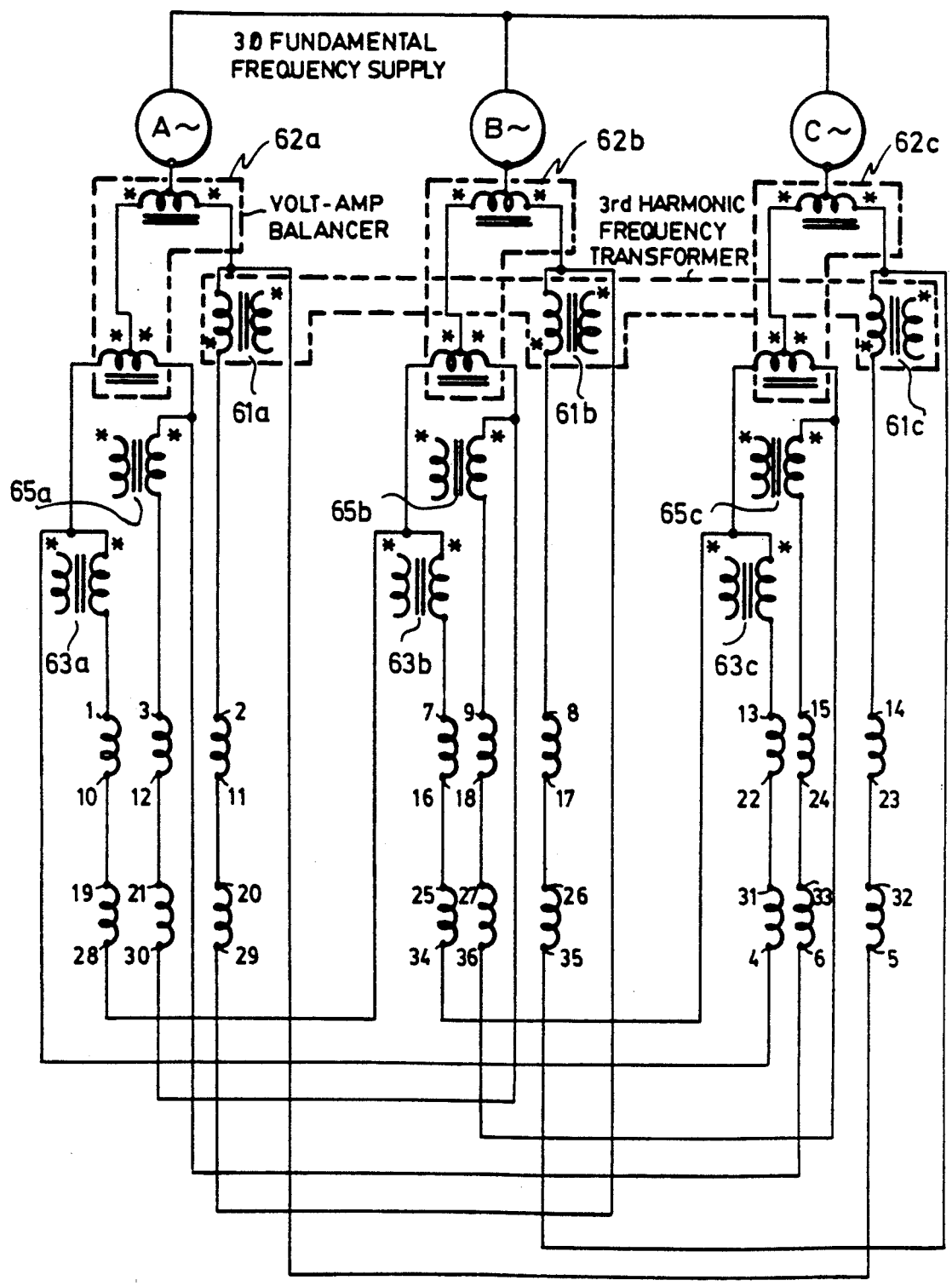
FIG. 13 schematically depicts the electrical connections for the machine of FIG. 12.

FIG. 12 depicts another embodiment of this method of harmonic injection into a four-pole, thirty-six slot machine 60, with windings corresponding to a 60 degree phase belt connection. The actual connection diagram for machine 60 is depicted in FIG. 13. As can be seen in FIG. 13, the polarity of each third harmonic transformer 61a, 61b, 61c coupled to the delta in slot 2 is reversed relative to the polarity of third harmonic transformers 63a, 63b, 63c; 65a, 65b, 65c, coupled to the deltas in slots 1 and 3. The volt-ampere rating of the three volt-amp balancers 62a, 62b and 62c of FIG. 13 is 0.18 that of the transformers required to provide the nine-phase supply discussed in reference to the system of FIGS. 5 and 6. The volt-ampere rating of the balancers is therefore substantially less even than that of the system of FIGS. 8-10 having 120 degree phase belt connections.

Figure 14:
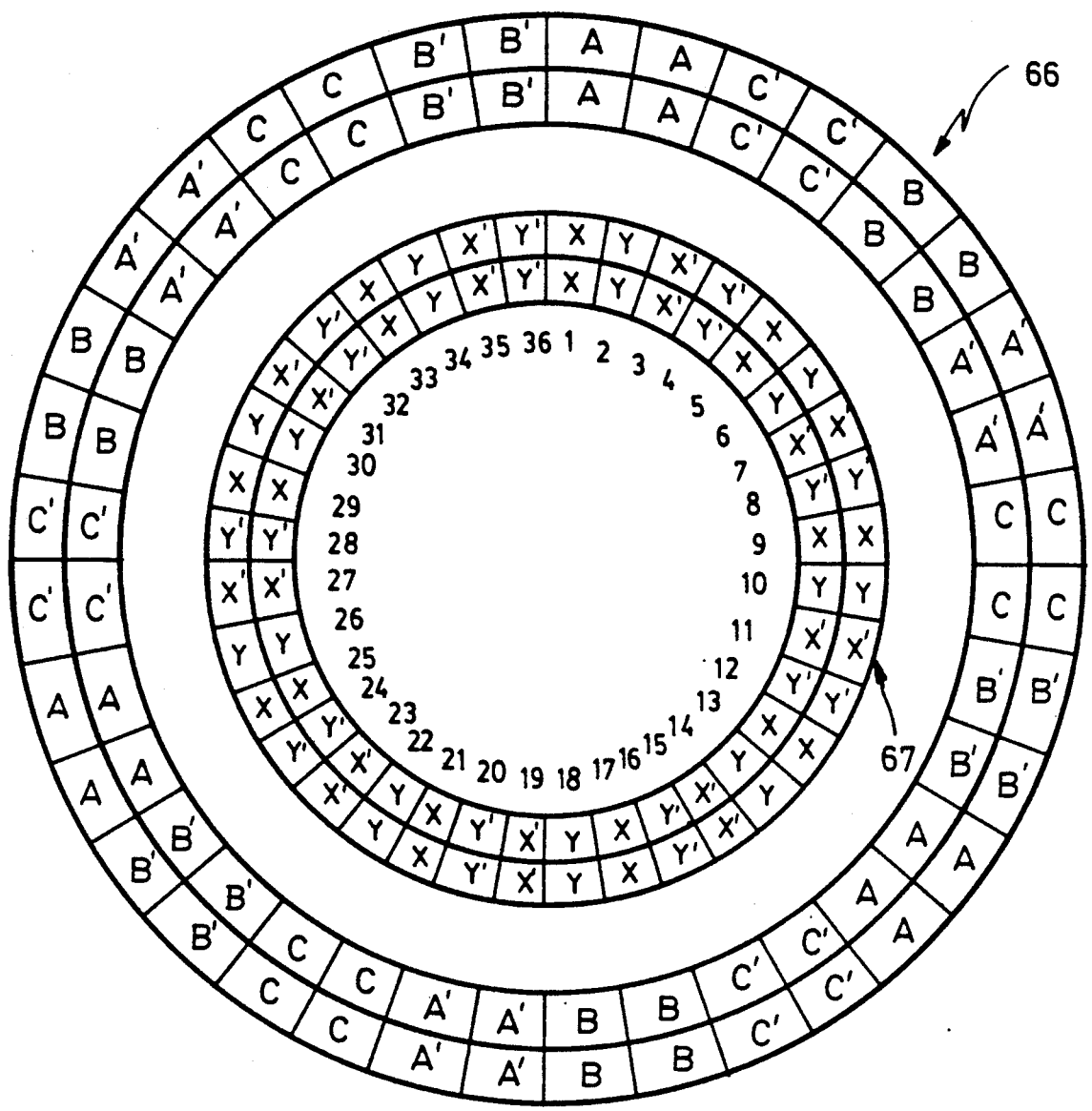
FIG. 14 schematically depicts the windings of an alternative embodiment of a machine to be excited through use of volt-amp balancers.

Another example of the present invention is illustrated through use of an ideal machine having two third harmonic phases. FIG. 14 schematically depicts a three-phase full-pitch, double layer winding six-pole fundamental, 36 slot machine 66. Referring to the number of slots per third harmonic pole is: $36/(3 \times 6) = 2$. Referring to equation 4, because 2 is the smallest multiplier of 2 other than 1, the number of phases of the third harmonic excitation is 2. Ring 67 depicts the third harmonic phase distribution for machine 66.

Figure 15:
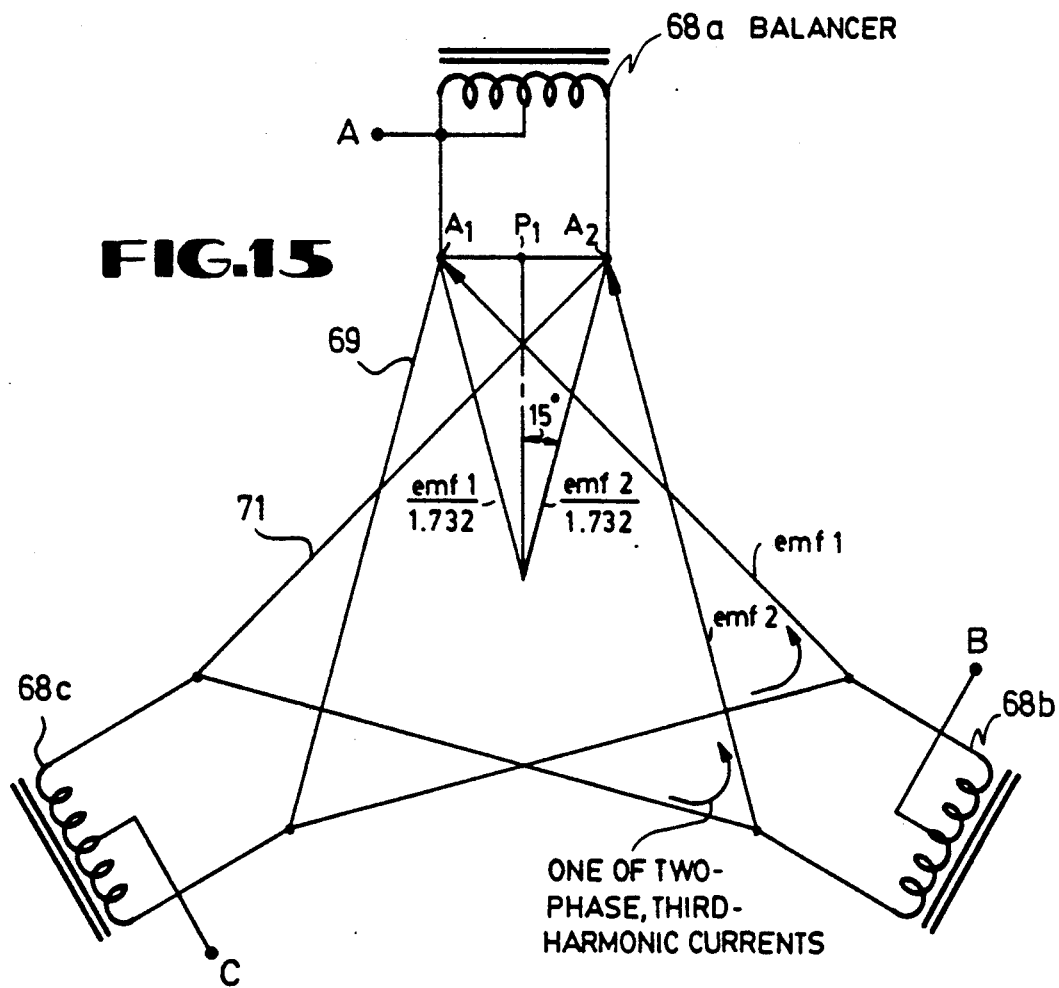
FIG. 15 schematically depicts the connections and the fundamental frequency back emf potential points for the machine of FIG. 14.
Figure 16:
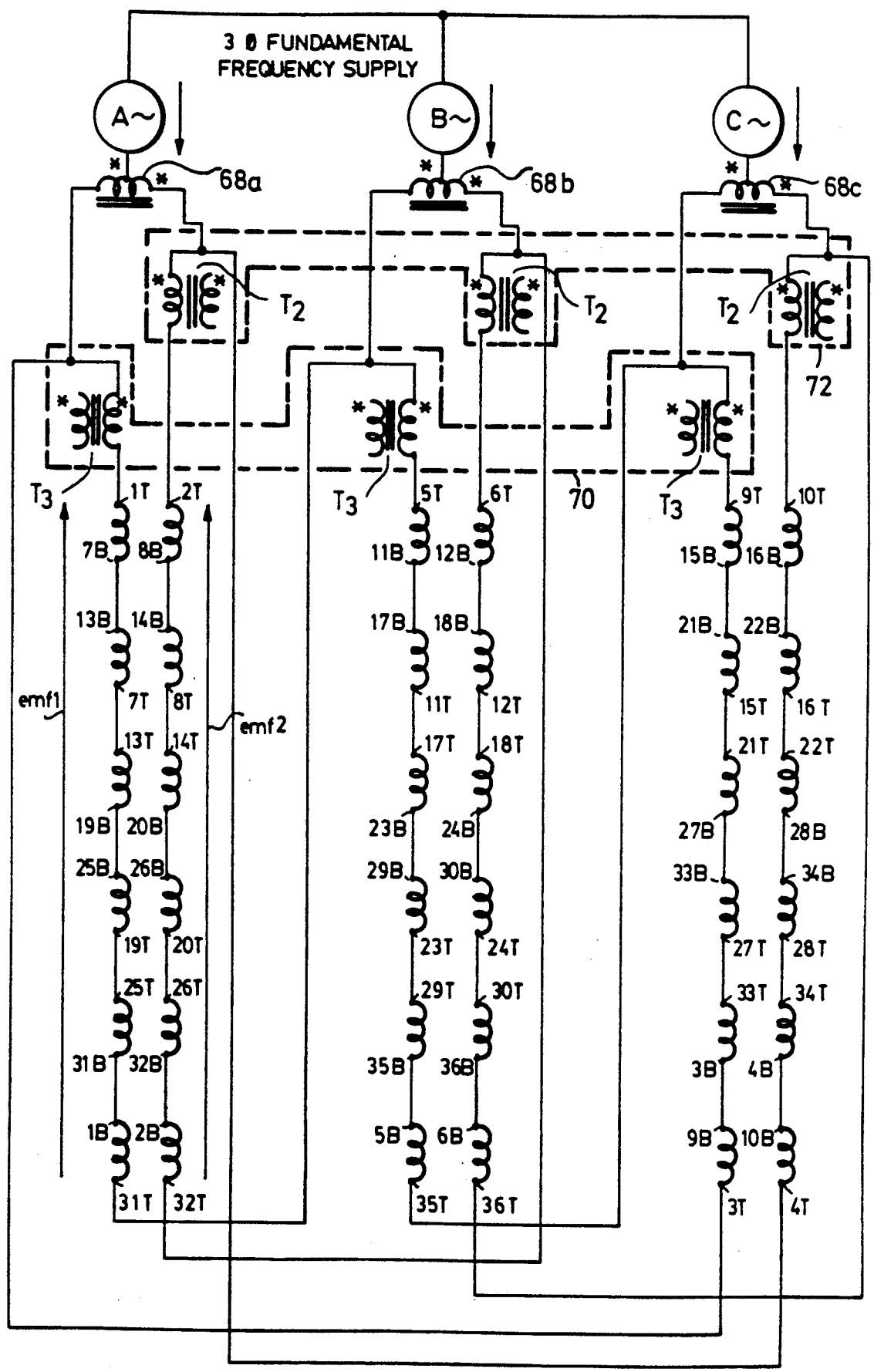
FIG. 16 schematically depicts the electrical connections for the machine of FIGS. 14 and 15.

Referring now also to FIGS. 15 and 16, the windings of machine 66 are connected in two deltas 69, 71. FIG. 15 depicts the winding fundamental frequency back emf potential points (A1 and A2), corresponding to the connection of the volt-amp balancers 68a, 68b, and 68c of FIG. 17. In the machine of FIGS. 14-16, the total volt-amp rating of the three volt-amp balancers is 0.26 that of the transformers that would be needed to supply the fundamental frequency excitation through use of a three-phase fundamental frequency supply as discussed in reference to FIGS. 5 and 6. One phase of the third harmonic excitation is applied to each leg of a delta through transformers as depicted at 70 and 72 in FIG. 16.

Because the third harmonic excitation of machine 66 is two phase, one autotransformer is used for each volt-amp balancer 68a, 68b, 68c. FIG. 16 schematically depicts a detailed connection diagram for exciting machine 66. Each third harmonic frequency supply transformer, 70 and 72, supplies one of the two phases of the third harmonic excitation current. Each transformer 70 and 72 preferably includes a single primary and three equivalent secondaries, coupled in the deltas as shown. As is well known in the art, because each secondary carries one phase of the fundamental frequency current, the mmf's of these fundamental frequency currents add to zero, and no fundamental frequency current is induced in the primary of the third harmonic transformers. This is true of all third harmonic transformers in all other embodiments described herein.

Figure 17:
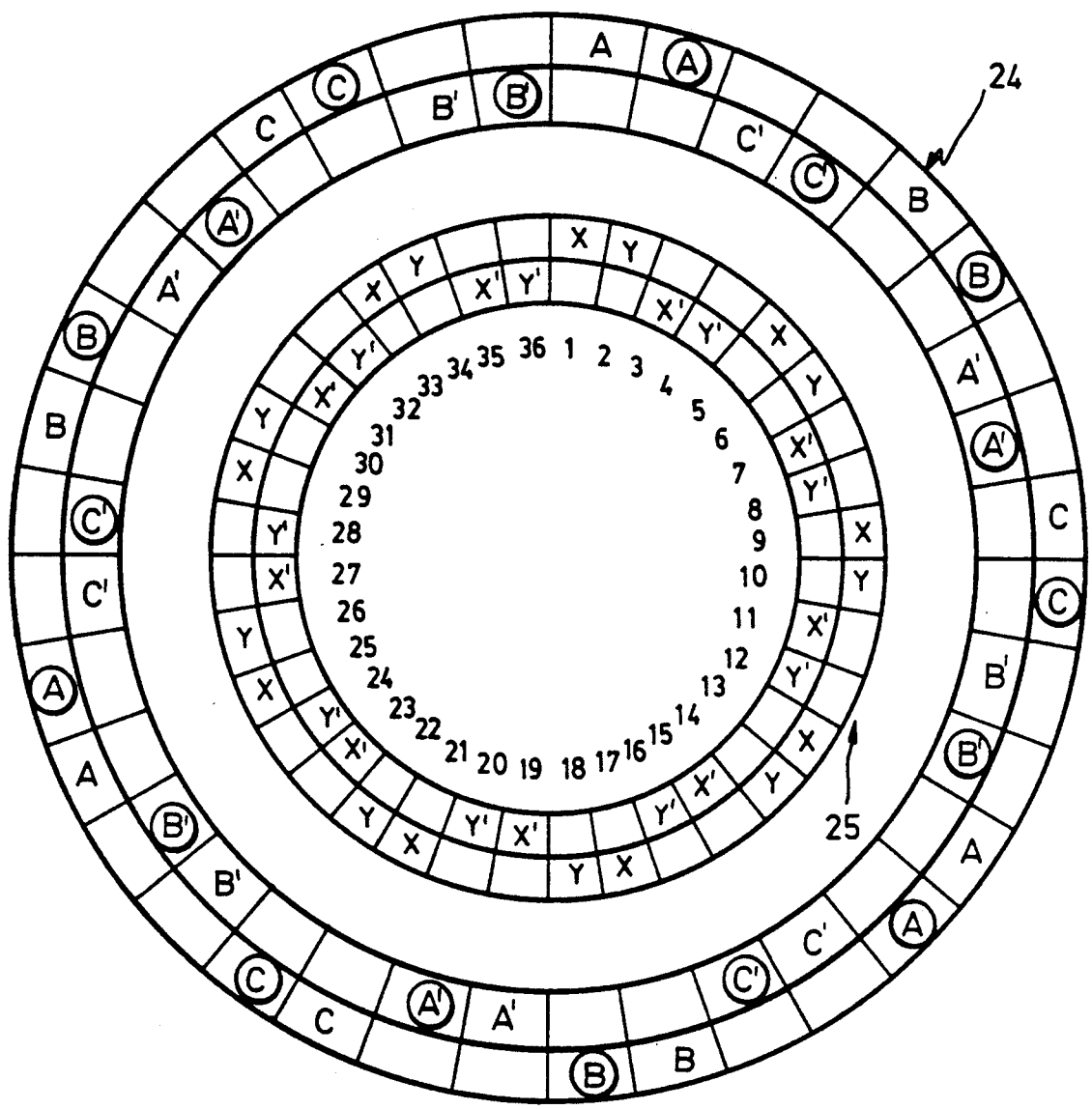
FIG. 17 schematically depicts the winding configuration for the armature of a machine to be excited through use of a multiphase inverter.

A fourth method of injection of third harmonic frequencies utilizes a single stator winding in conjunction with a multiphase inverter. Referring now to FIG. 17, therein is schematically depicted a machine 74 having six fundamental poles in thirty-six slots. The windings of machine 74 are connected in two deltas, 78 and 80, displaced 30 electrical degrees from one another, each is excited by a three-phase fundamental frequency supply. Windings indicated by letters enclosed in circles in FIG. 17 represent windings of the second delta as opposed to windings represented by the unencircled letters. For example winding pair $A_1-A'_7$ is connected in delta 78, while winding $A_2-A'_8$ is connected in delta 80. Ring 75 depicts the distribution of the third harmonic phases in machine 74.

Figure 18:
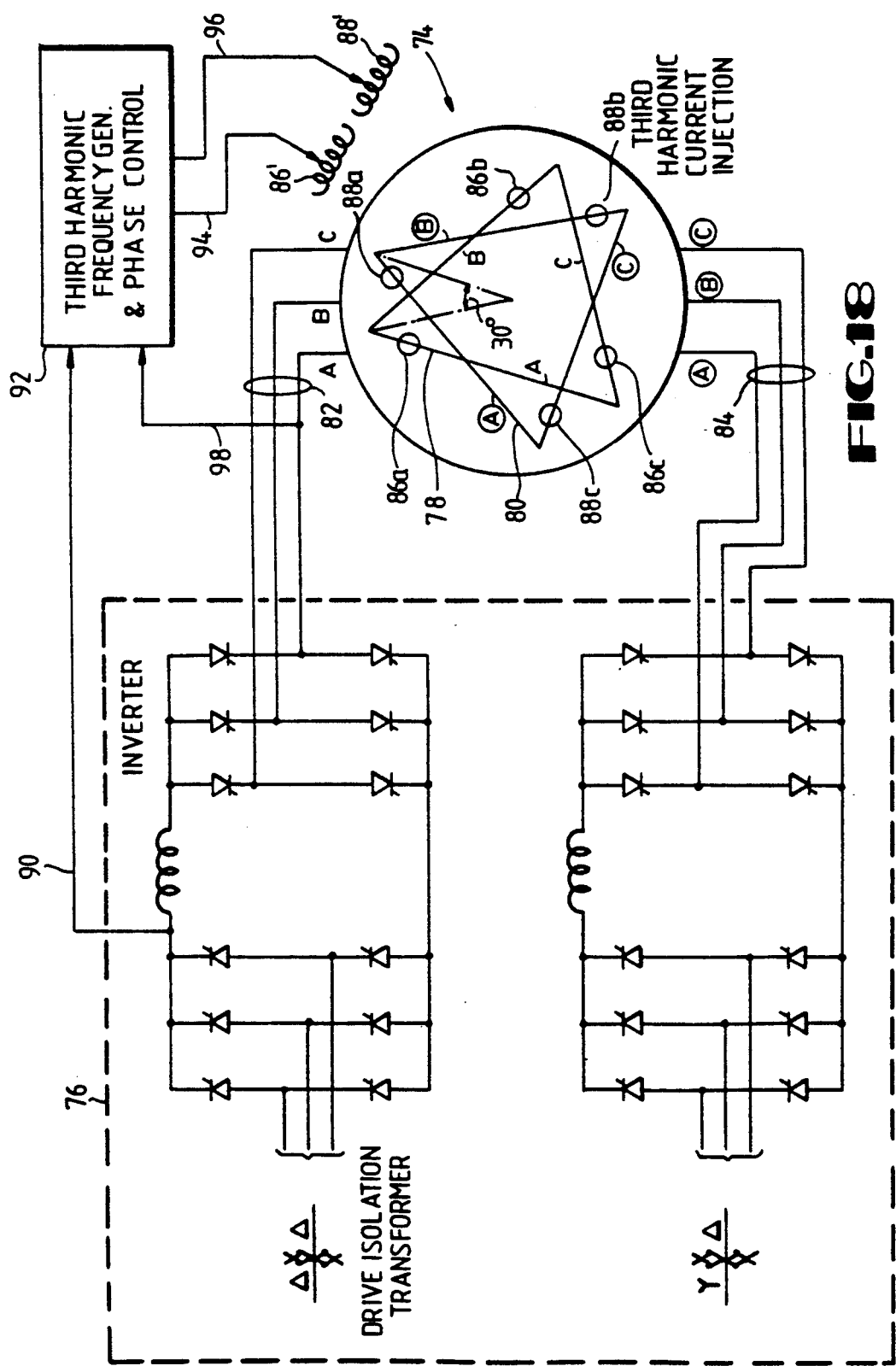
FIG. 18 schematically depicts the connections of the machine of FIG. 17 fed by an inverter.

FIG. 18 schematically depicts machine 74 and a multiphase inverter power supply 76 suitable for use therewith. In the method of this embodiment, neither the multiphase power transformers utilized with the apparatus of FIGS. 5 and 6, nor the volt-amp balancers of the various apparatus of FIGS. 7-16 are required. Multiphase inverter 76 provides two three-phase fundamental frequencies 82, 84 each displaced 30 degrees from one another. The first fundamental frequency outputs 82 are coupled to first delta 78, while second fundamental frequency outputs 84 are coupled to second delta 80.

The third harmonic excitation is two phase. Each phase is injected into one of the fundamental delta windings 78, 80. Each leg of each delta, 78, 80, includes the secondary 86a, 86b, 86c; 88a, 88b, 88c, respectively, of a transformer having its primary coupled to a third harmonic frequency supply. Because this multiphase inverter method of the present invention is particularly suitable for use with adjustable frequency drives, it is advantageous to generate the third harmonic frequency directly in response to the fundamental frequency. This may be done through conventional means. For example, the rectified power 90 is applied to a third harmonic frequency generator 92, which outputs two phases 94, 96. Third harmonic frequency generator 92 is preferably responsive to one phase of a fundamental frequency output 98 to enable precise frequency and phase control of third harmonic frequency phases 94 and 96. Third harmonic frequency phases 94 and 96 are coupled to primaries 86', 88' of transformer secondaries 86a, 86b, 86c: and 88a, 88b, 88c, respectively.

Each of the above-discussed methods and apparatus optimizes flux distribution in a polyphase AC machine. As discussed in reference to FIGS. 2A–C, the optimal phase relationship is selected between the harmonic excitation current and the fundamental excitation current to facilitate optimal distribution of the flux density and optional increases in the total flux per pole of the machine.

Many modifications and variations may be made in the techniques and structures described and illustrated herein without departing from the spirit and the scope of the present invention. Accordingly, it is to be readily understood that the embodiments described and illustrated herein are illustrative only and are not to be considered as limitations for the present invention.

We claim:

1. A method for exciting a polyphase alternating current machine to controllably produce a flux wave of a preselected configuration in an air-gap of said machine, comprising the steps of:
    exciting said machine with a polyphase fundamental frequency current so that a fundamental flux wave rotates in the air-gap of said machine at a speed corresponding to the frequency of said fundamental current;
    exciting said machine with an odd harmonic frequency current of said fundamental frequency current so that an odd harmonic flux wave rotates in the air-gap of said machine at a speed substantially identical to the frequency of said fundamental current, said odd harmonic frequency current being approximately 45 degrees out of phase with said fundamental frequency current; and
    combining said fundamental and harmonic flux waves to produce a resultant flux wave having a peak amplitude greater than the amplitude of the fundamental flux wave.

2. A method, as set forth in claim 1, wherein said step of exciting said machine with a polyphase fundamental frequency current includes applying said fundamental frequency current to a first set of windings, and wherein said step of exciting said machine with an odd harmonic frequency current includes applying said odd harmonic frequency current to a second set of windings.

3. A method, as set forth in claim 1, wherein the steps of exciting said machine with the polyphase fundamental frequency current and the odd harmonic frequency includes applying said fundamental frequency current and said odd harmonic frequency current to a single set of windings.

4. A method, as set forth in claim 3, wherein the windings in said single set of windings are connected in a plurality of deltas.

5. A method, as set forth in claim 4, wherein said deltas are current balanced relative to one another.

6. A method, as set forth in claim 4, wherein said deltas are coupled to one another through transformers.

7. A method, as set forth in claim 6, wherein the step of applying said odd harmonic frequency current includes delivering one phase of said odd harmonic frequency current to each leg of one of said deltas.

8. A method for exciting a polyphase alternating current machine to controllably produce a flux wave of a preselected configuration in an air-gap of said machine, comprising the steps of:
    generating a fundamental flux wave rotating in the air-gap of said machine at a first preselected speed by exciting said machine with a polyphase fundamental frequency current;
    generating an odd harmonic flux wave rotating in the air-gap of said machine at said first preselected speed approximately 45 degrees out of phase with said fundamental flux wave by exciting said machine with an odd harmonic frequency current of said fundamental frequency current; and
    combining said fundamental and odd harmonic flux waves to produce a resultant flux wave having a peak amplitude greater than the amplitude of the fundamental flux wave.

9. A method for exciting a polyphase alternating current machine to controllably produce a flux wave of a preselected configuration in an air-gap of said machine, comprising the steps of:
    generating a fundamental flux wave rotating in the air-gap of said machine at a first preselected speed by exciting said machine with a polyphase fundamental frequency current;
    generating an odd harmonic flux wave rotating in the air-gap of said machine at substantially the same speed as said first preselected speed by exciting said machine with an odd harmonic frequency current of said fundamental frequency current; and
    adjusting the phase relationship of said harmonic flux wave relative to said fundamental flux wave to produce a resultant flux wave having a peak amplitude greater than the amplitude of the fundamental flux wave.

10. An apparatus for exciting a polyphase alternating current machine having at least one set of stator windings to controllably produce a flux wave of a preselected configuration in an air-gap of said machine, comprising:
    means for exciting at least a portion of said stator windings with a polyphase fundamental frequency current and generating a resultant fundamental flux wave rotating in the air-gap of said machine at a first preselected speed;
    means for exciting at least a portion of said stator windings with an odd harmonic frequency current of said fundamental frequency current and generating a resultant odd harmonic flux wave rotating in the air-gap of said machine at said first preselected speed; and
    means for adjusting the phase relationship of said harmonic flux wave relative to said fundamental flux wave to produce a resultant flux wave having a peak amplitude greater than the amplitude of the fundamental flux wave.

11. An apparatus, as set forth in claim 10, wherein said windings include a first set of windings adapted for receiving said fundamental frequency current and a second set of windings adapted for receiving said odd harmonic frequency current.

12. An apparatus, as set forth in claim 10, wherein said windings include a single set of windings adapted for receiving said fundamental and odd harmonic frequency currents.

13. An apparatus for exciting a polyphase alternating current machine to controllably produce a flux wave of a preselected configuration in an air-gap of said machine, comprising:

means for exciting said machine with a polyphase fundamental frequency current so that a fundamental flux wave rotates in the air-gap of said machine at a speed corresponding to the frequency of said fundamental current;

means for exciting said machine with an odd harmonic frequency current of said fundamental frequency current, said odd harmonic frequency current being approximately 45 degrees out of phase with said fundamental frequency current so that an odd harmonic flux wave rotates in the air-gap of said machine at a speed corresponding to the frequency of said fundamental current, said fundamental and harmonic flux waves combining to produce an air-gap resultant flux wave having at least one peak amplitude greater than the amplitude of the fundamental flux wave.

14. An apparatus for exciting a polyphase alternating current machine having at least one set of stator windings to controllably produce a flux wave of a preselected configuration in selected portions of said machine, comprising:

a fundamental frequency current source adapted for exciting the windings of said machine so that a fundamental flux wave rotates in the air-gap of said machine at a speed corresponding to the frequency of said fundamental current;

an odd harmonic frequency current source adapted for exciting the windings of said machine so that an odd harmonic flux wave rotates in the air-gap of said machine at a speed corresponding to the frequency of said fundamental current; and means for adjusting the phase relation of said odd harmonic current relative to said fundamental frequency current to increase the maximum flux in selected portions of said machine and reduce the maximum flux in selected other portions of said machine.

15. An apparatus, as set forth in claim 14, wherein said selected portions of said machine include a stator core, a rotor core, stator teeth, rotor teeth, and an air-gap, and said adjusting means includes means for increasing the maximum teeth and air-gap flux and reducing the maximum core flux.

* * * * *